US011979522B2

(12) United States Patent
Maruyama

(10) Patent No.: US 11,979,522 B2
(45) Date of Patent: May 7, 2024

(54) IMAGE PROCESSING SYSTEM, IMAGE FORMING APPARATUS, METHOD OF CONTROLLING IMAGE FORMING APPARATUS, AND STORAGE MEDIUM THAT DETERMINE, FROM A SCANNED IMAGE, AN UNDESIRABLE AREA OF UNDESIRED OBJECT

(71) Applicant: CANON KABUSHIKI KAISHA, Tokyo (JP)

(72) Inventor: Naoki Maruyama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/187,947

(22) Filed: Mar. 22, 2023

(65) Prior Publication Data
US 2023/0319196 A1 Oct. 5, 2023

(30) Foreign Application Priority Data
Mar. 30, 2022 (JP) .................. 2022-056178

(51) Int. Cl.
*H04N 1/00* (2006.01)
*G09B 7/00* (2006.01)

(52) U.S. Cl.
CPC ..... *H04N 1/00092* (2013.01); *H04N 1/00045* (2013.01); *H04N 1/00074* (2013.01); *G09B 7/00* (2013.01); *H04N 2201/0094* (2013.01)

(58) Field of Classification Search
CPC ........... H04N 1/00092; H04N 1/00045; H04N 1/00074; G09B 7/00

USPC ............... 358/1.14, 1.15, 1.18, 3.26
See application file for complete search history.

(56) References Cited

U.S. PATENT DOCUMENTS

| 6,035,072 A * | 3/2000 | Read | G06V 30/18095 |
| | | | 358/463 |
| 2007/0178432 A1* | 8/2007 | Davis | G09B 7/02 |
| | | | 434/353 |
| 2009/0186327 A1* | 7/2009 | McGinley | G09B 3/00 |
| | | | 434/323 |

FOREIGN PATENT DOCUMENTS

JP 2015159427 A 9/2015

* cited by examiner

*Primary Examiner* — Jamares Q Washington
(74) *Attorney, Agent, or Firm* — ROSSI, KIMMS & McDOWELL LLP

(57) ABSTRACT

An image processing system capable of preventing resubmission of a scanned image from being required due to an undesired object which obstructs visibility. The image processing system includes a scanned image generation unit configured to read an original and generate a scanned image of the read original, and submits an image to a management server. A continuous pixel area which includes a plurality of pixels whose pixel values are higher than a predetermined density threshold value and has an area size equal to or larger than a predetermined value is identified from a scanned image. Whether or not the identified continuous pixel area is an area of an undesired object which obstructs visibility is determined. A continuous pixel area determined as the area of an undesired object is notified to a user before the scanned image is submitted to the management server.

12 Claims, 26 Drawing Sheets

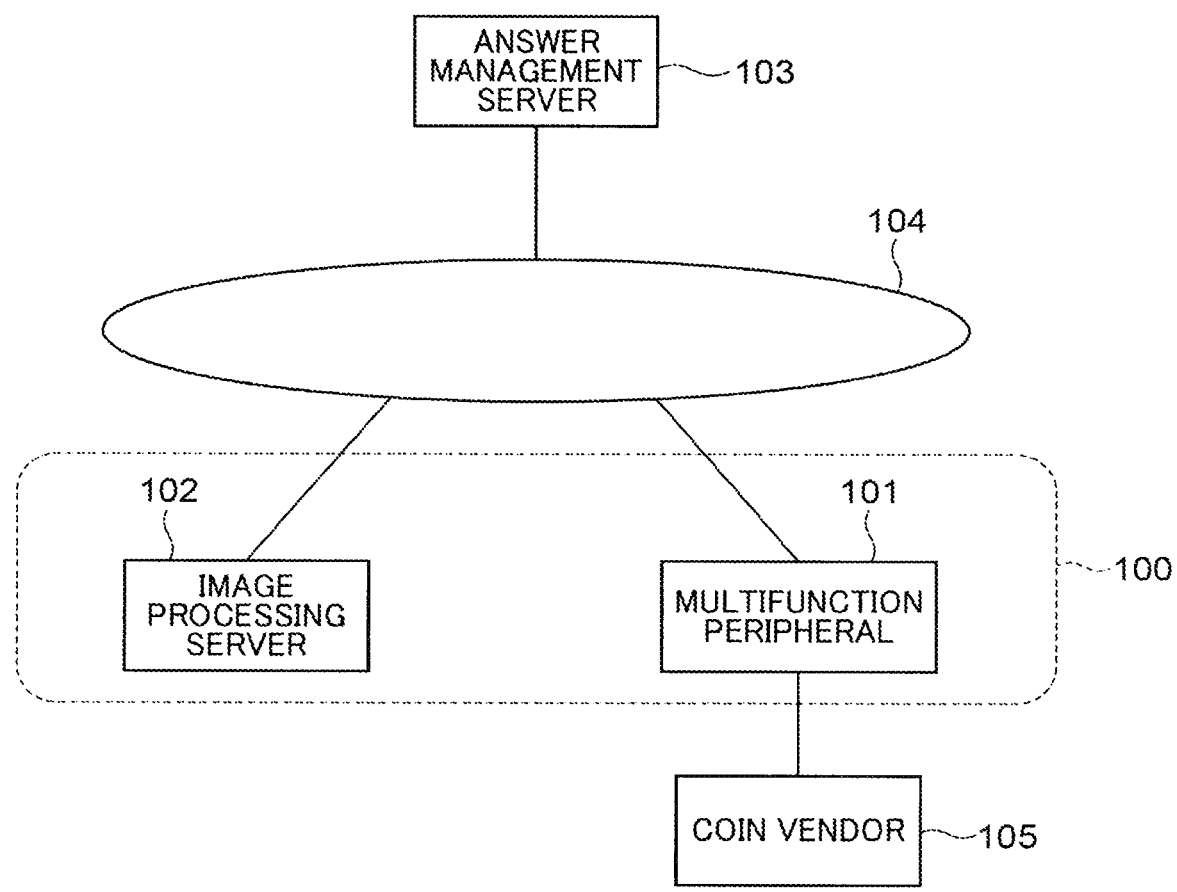

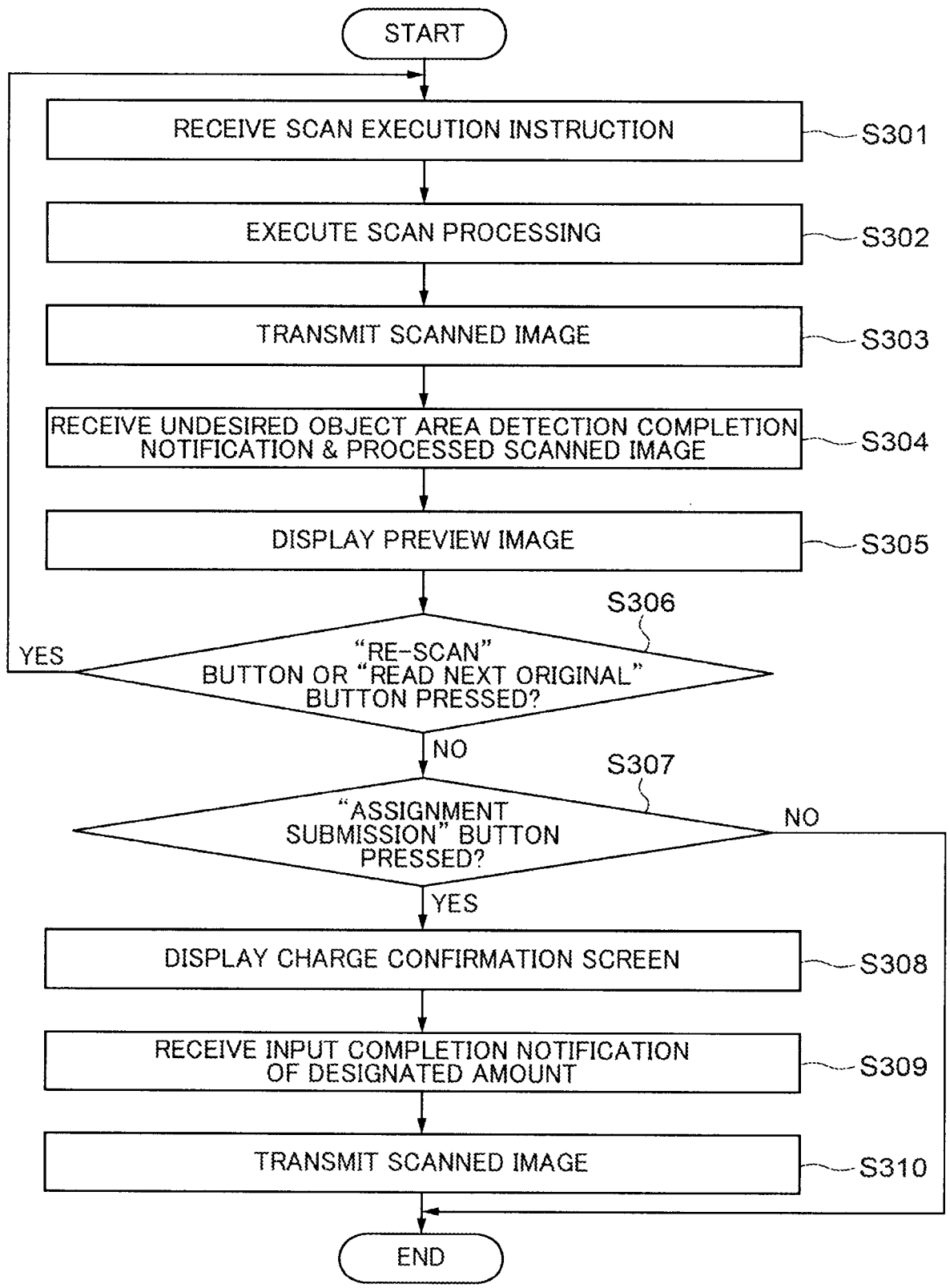

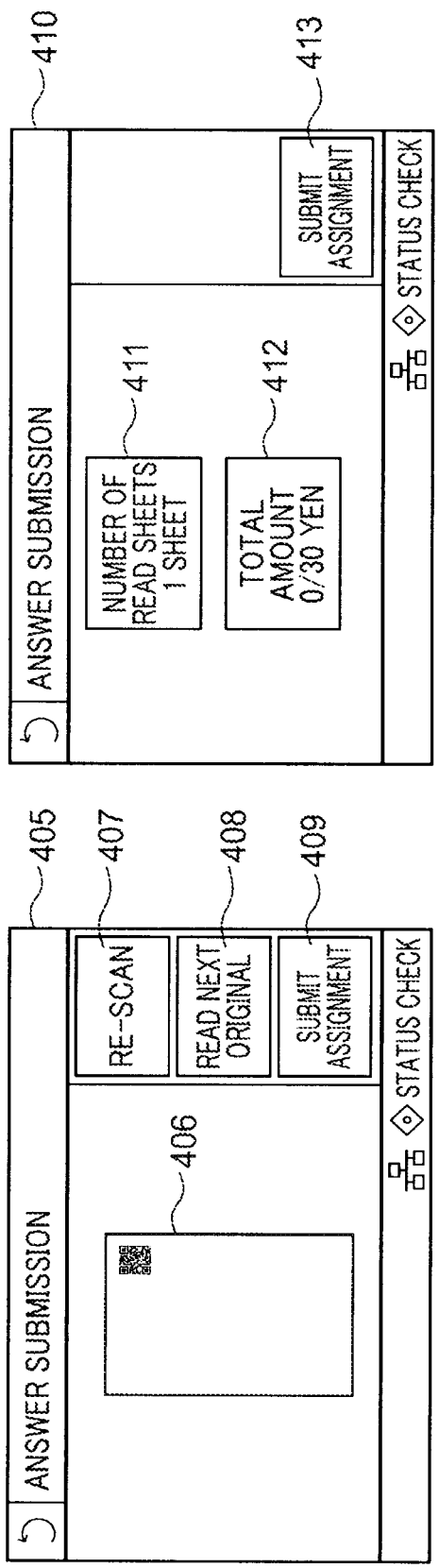

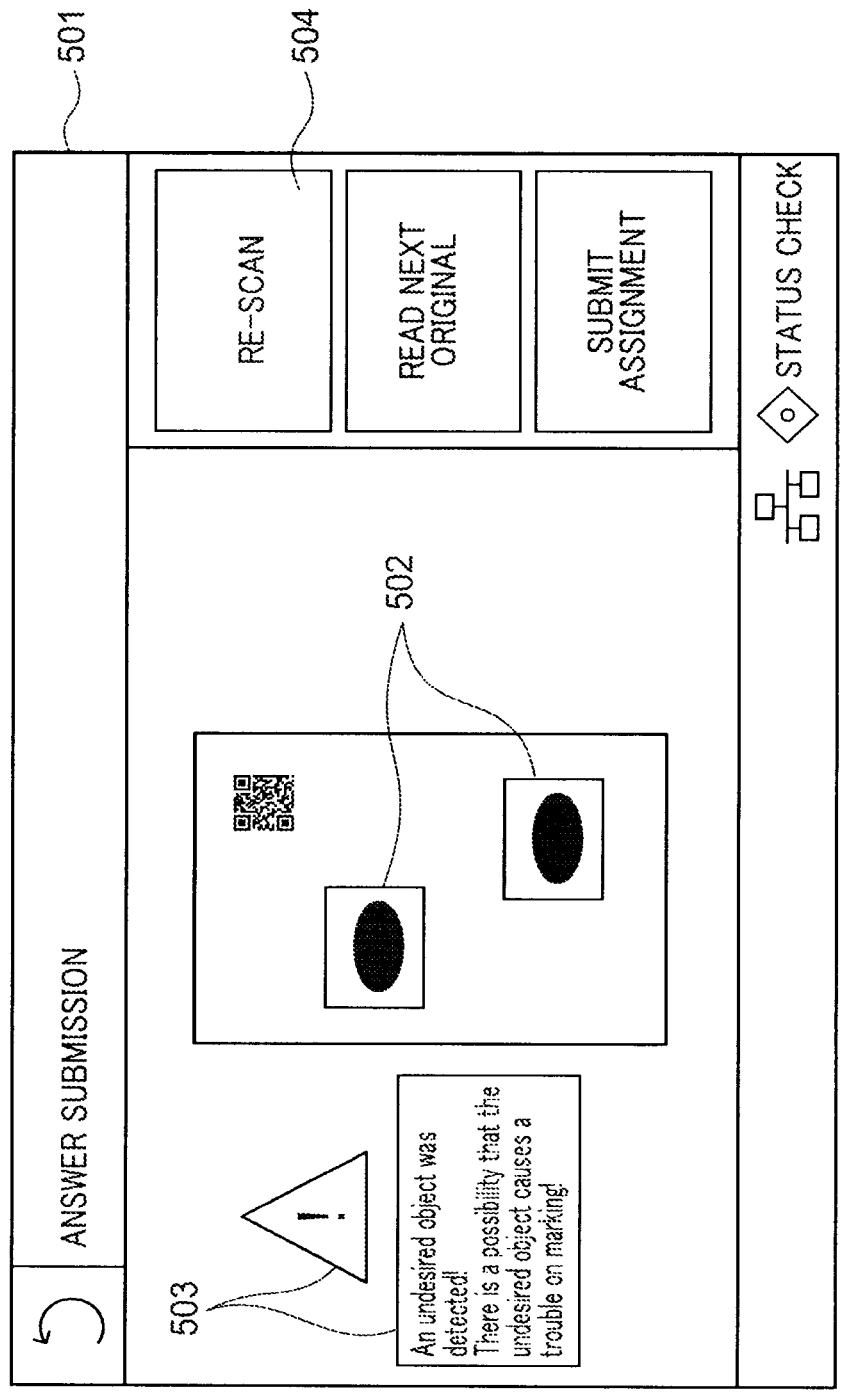

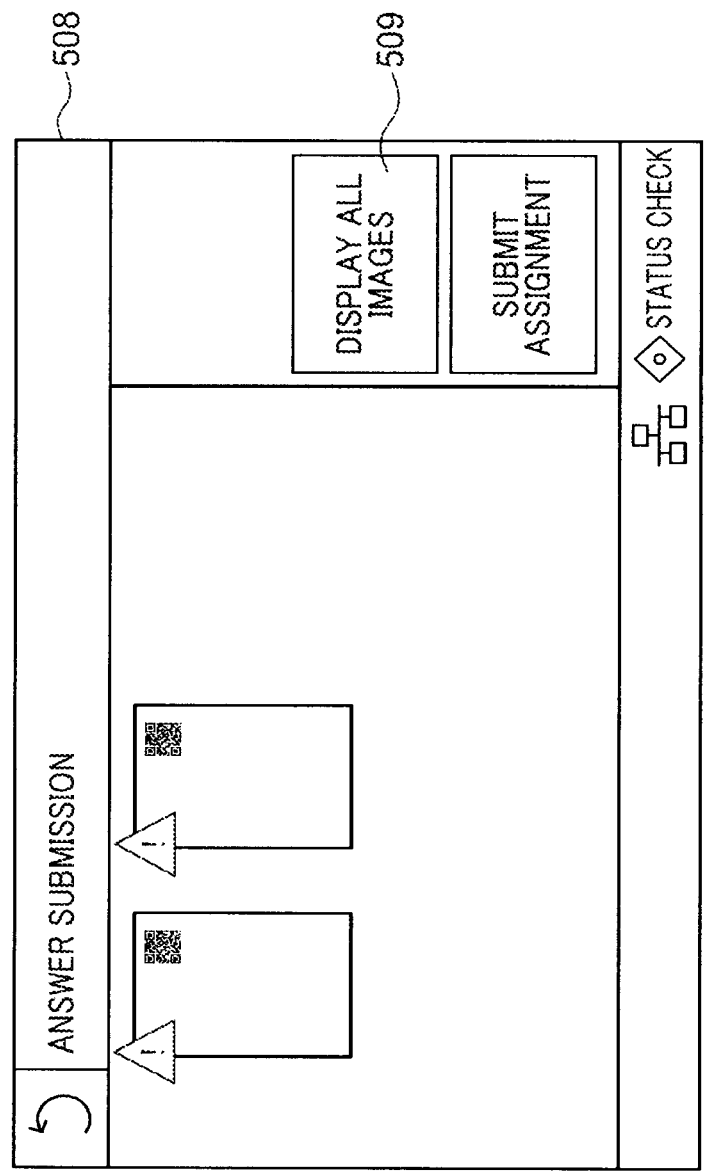

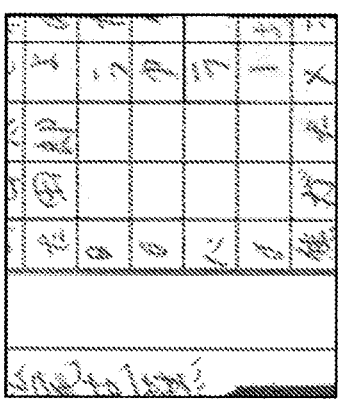
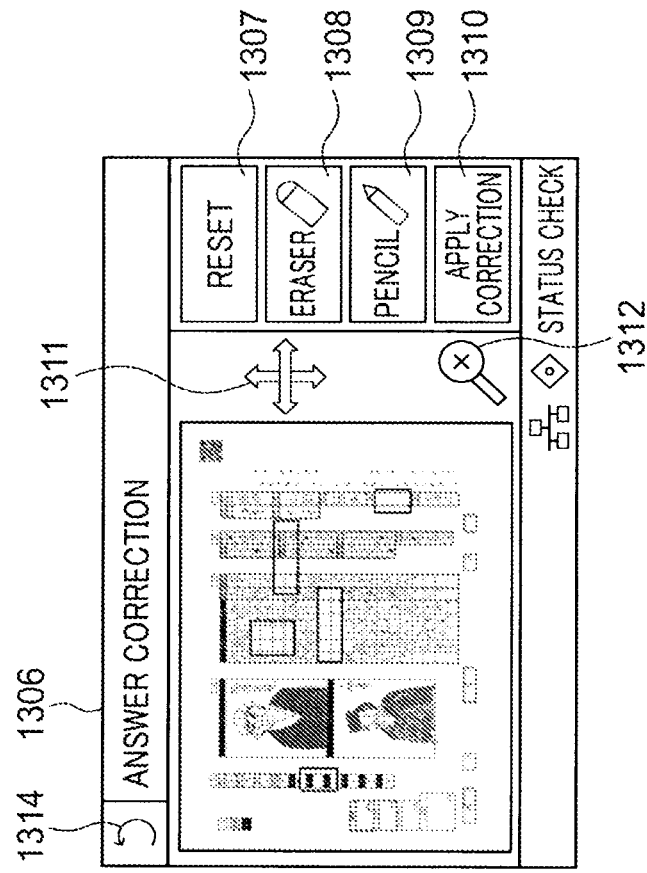

IMAGE PROCESSING SYSTEM, IMAGE FORMING APPARATUS, METHOD OF CONTROLLING IMAGE FORMING APPARATUS, AND STORAGE MEDIUM THAT DETERMINE, FROM A SCANNED IMAGE, AN UNDESIRABLE AREA OF UNDESIRED OBJECT

BACKGROUND OF THE INVENTION

Field of the Invention

The present invention relates to an image processing system, an image forming apparatus, a method of controlling the image forming apparatus, and a storage medium.

Description of the Related Art

There is known an image processing system that submits an answer sheet using a multifunction peripheral. In this image processing system, the multifunction peripheral reads an answer sheet, generates a scanned image of the read answer sheet, and transmits the scanned image to a management server. A marker performs marking using the scanned image stored in the management server. In this image processing system, there is a case where after a scanned image of an answer sheet is submitted, resubmission of the scanned image is requested. As the case where resubmission of the scanned image is requested, for example, there may be mentioned a case where a character or diagram cannot be read due to an image of an undesired object which obstructs visibility, such as dirt adhering to the answer sheet or a slip attached to the answer sheet, which makes it impossible to perform marking.

On the other hand, there has been proposed a technique that identifies, from a scanned image generated by reading an original to which a slip is attached, an area of the attached slip and restores a missing image of the identified area (see e.g. Japanese Laid-Open Patent Publication (Kokai) No. 2015-159427). By using this technique, for example, it is envisaged to identify an area of an undesired object that obstructs visibility, such as dirt adhering to the answer sheet or a slip attached to the answer sheet, from a scanned image of the answer sheet and thereby prevent the resubmission from being required.

However, the technique disclosed in Japanese Laid-Open Patent Publication (Kokai) No. 2015-159427 makes it possible to identify, only when a slip overlaps a margin area of an original, an area of this slip. Therefore, it is impossible to identify an area of an undesired object which does not overlap a margin area of an original and exists inside the margin area. As a result, it is impossible to prevent resubmission of the answer sheet from being required due to an undesired object.

SUMMARY OF THE INVENTION

The present invention provides an image processing system that is capable of preventing resubmission of a scanned image from being required due to an undesired object which obstructs visibility.

In a first aspect of the present invention, there is provided an image processing system that includes a scanned image generation unit configured to read an original and generate a scanned image of the read original, and submits an image to a management server, including an identification unit configured to identify a continuous pixel area from the scanned image, the continuous pixel area including a plurality of pixels whose pixel values are higher than a predetermined density threshold value and having an area size equal to or larger than a predetermined value, a determination unit configured to determine whether or not the identified continuous pixel area is an area of an undesired object which obstructs visibility, and a notification unit configured to notify a user of a continuous pixel area determined as the area of an undesired object, before the scanned image is submitted to the management server.

In a second aspect of the present invention, there is provided an image forming apparatus that includes a scanned image generation unit configured to read an original and generate a scanned image of the read original, and submits an image to a management server, including an identification unit configured to identify a continuous pixel area from the scanned image, the continuous pixel area including a plurality of pixels whose pixel values are higher than a predetermined density threshold value and having an area size equal to or larger than a predetermined value, a determination unit configured to determine whether or not the identified continuous pixel area is an area of an undesired object which obstructs visibility, and a notification unit configured to notify a user of a continuous pixel area determined as the area of an undesired object before the scanned image is submitted to the management server.

In a third aspect of the present invention, there is provided a method of controlling an image forming apparatus that submits an image to a management server, including reading an original and generating a scanned image of the read original, identifying a continuous pixel area from the scanned image, the continuous pixel area including a plurality of pixels whose pixel values are higher than a predetermined density threshold value and having an area size equal to or larger than a predetermined value, determining whether or not the identified continuous pixel area is an area of an undesired object which obstructs visibility, and notifying a user of a continuous pixel area determined as the area of an undesired object before the scanned image is submitted to the management server.

According to the present invention, it is possible to prevent resubmission of a scanned image from being required due to an undesired object which obstructs visibility.

Further features of the present invention will become apparent from the following description of exemplary embodiments (with reference to the attached drawings).

BRIEF DESCRIPTION OF THE DRAWINGS

FIG. 1 is a diagram showing an example of the entire configuration of an image processing system according to the present embodiment.

FIG. 3 is a flowchart of an answer sheet submission control process performed by the multifunction peripheral appearing in FIG. 1.

FIGS. 4A to 4F are diagrams each showing an example of a screen displayed on a console section appearing in FIG. 2A.

FIGS. 5A to 5D are diagrams each showing an example of a preview screen displayed on the console section appearing in FIG. 2A.

FIGS. 13A to 13E are diagrams each showing an example of data used by the image processing server appearing in FIG. 1 and an example of a preview screen displayed on the console section.

DESCRIPTION OF THE EMBODIMENTS

Figure 2B:
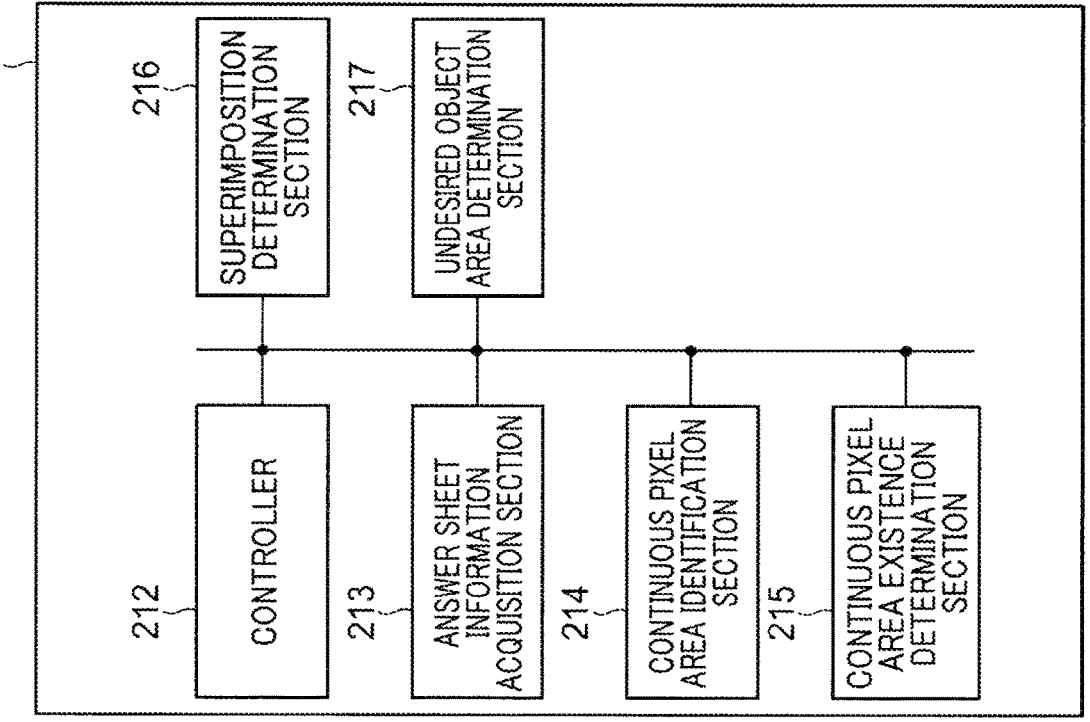
FIG. 2B is a schematic block diagram of an image processing server appearing in FIG. 1.

The present invention will now be described in detail below with reference to the accompanying drawings showing embodiments thereof. Note that the present invention is not limited to the embodiment described below, and not all combinations of features described in the embodiment are absolutely essential to the solution according to the invention.

FIG. 1 is a diagram showing an example of the entire configuration of an image processing system 100 according to the present embodiment. Referring to FIG. 1, the image processing system 100 includes a multifunction peripheral 101 as an image forming apparatus and an image processing server 102 as an image processing apparatus. Although in the present embodiment, a description will be given of the configuration that the image forming apparatus is a multifunction peripheral, the image forming apparatus is not limited to the multifunction peripheral but may be an apparatus which is not equipped with a print function, such as a scanner. The multifunction peripheral 101 and the image processing server 102 are connected to each other via a network 104. Further, the multifunction peripheral 101 and the image processing server 102 can communicate with an answer management server 103 as a management server via the network 104. To the multifunction peripheral 101, a coin vendor 105 as a charging device is connected. Although in the present embodiment, a description will be given of the configuration in which the coin vendor 105 is connected to the multifunction peripheral 101, this is not limitative, but a configuration in which the coin vendor 105 is not connected to the multifunction peripheral 101 may be employed.

In the image processing system 100, the multifunction peripheral 101 reads an answer sheet on which answers have been written, generates a scanned image of the answer sheet, and transmits the scanned image to the image processing server 102 via the network 104. The image processing server 102 analyzes the scanned image acquired from the multifunction peripheral 101, determines whether or not an image of an undesired object which obstructs visibility, such as dirt and a slip, is included in any answer field area, and transmits a result of the determination to the multifunction peripheral 101. The multifunction peripheral 101 having received the determination result transmits the scanned image to the answer management server 103 in a case where no undesired object image is included in the answer field area(s). On the other hand, if an undesired object image is included in any answer field area, the multifunction peripheral 101 notifies a user of an area of the undesired object.

Figure 2A:
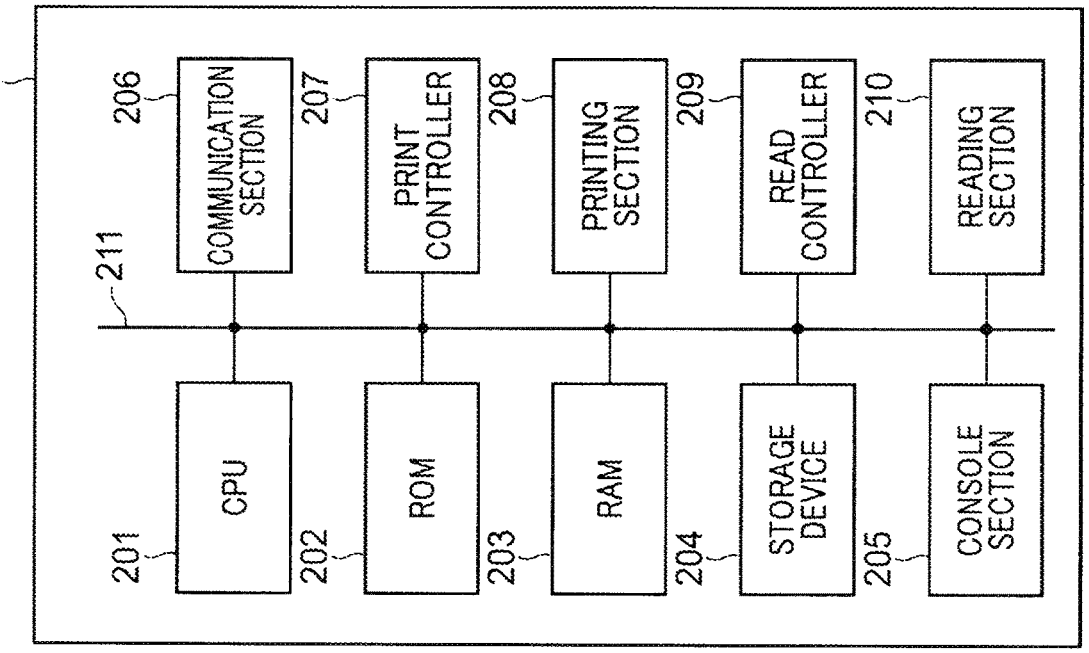
FIG. 2A is a schematic block diagram of a multifunction peripheral appearing in FIG. 1.

FIGS. 2A and 2B are respective schematic block diagrams of the multifunction peripheral 101 and the image processing server 102 appearing in FIG. 1. FIG. 2A shows the configuration of the multifunction peripheral 101. Referring to FIG. 2A, the multifunction peripheral 101 includes a CPU 201, a ROM 202, a RAM 203, a storage device 204, a console section 205, a communication section 206, a print controller 207, a printing section 208, a read controller 209, and a reading section 210. These components are interconnected via a data bus 211.

The CPU 201 controls the overall operation of the multifunction peripheral 101. The ROM 202 is implemented by a flash memory and stores programs executed by the CPU 201, and so forth. The RAM 203 is a volatile memory and is used as a work area for the CPU 201 and a temporary storage area for temporarily storing data. The storage device 204 is a nonvolatile memory, such as a hard disk drive (HDD). The storage device 204 stores a scanned image generated by the reading section 210, and so forth.

The console section 205 is a section for interfacing with a user, by displaying information concerning the multifunction peripheral 101. On the console section 205, there are displayed, for example, an operation screen of an answer submission function and a preview image subjected to an undesired object area detection process. The communication section 206 communicates with the image processing server 102 and the answer management server 103 via the network 104. The print controller 207 performs image processing on image data of an acquired scanned image or the like to generate print data. The printing section 208 prints the print data generated by the print controller 207 on a recording medium, such as paper. The read controller 209 performs processing according to original reading settings and the like. The reading section 210 reads an original to generate a scanned image of the read original.

FIG. 2B shows the configuration of the image processing server 102. Referring to FIG. 2B, the image processing server 102 includes a controller 212, an answer sheet information acquisition section 213, a continuous pixel area identification section 214, a continuous pixel area existence determination section 215, a superimposition determination section 216, and an undesired object area determination section 217.

The controller 212 is comprised of a CPU, a ROM, and a RAM, none of which are shown, and controls the overall operation of the image processing server 102. The answer sheet information acquisition section 213 analyzes a scanned image acquired from the multifunction peripheral 101 and identifies answer field areas and marking field areas on an answer sheet. Further, the answer sheet information acquisition section 213 acquires a template image of the answer sheet.

The continuous pixel area identification section 214 analyzes a scanned image acquired from the multifunction peripheral 101 and identifies continuous pixel areas each of which includes a plurality of pixels whose pixel values are higher than a predetermined density threshold value and has an area size equal to or larger than a predetermined value. The continuous pixel area existence determination section 215 determines whether or not the continuous pixel area(s) identified by the continuous pixel area identification section 214 exist(s) in the template image of the answer sheet. The template image of the answer sheet is an image generated by a scanner that reads the answer sheet on which no answers have been written.

The superimposition determination section 216 determines whether or not a continuous pixel area determined by the continuous pixel area existence determination section 215 that the continuous pixel area does not exist in the template image of the answer sheet is superimposed on any of the answer field areas and the marking field areas. The undesired object area determination section 217 determines an area of an undesired object that obstructs visibility, such as dirt or a slip.

Figure 4A:
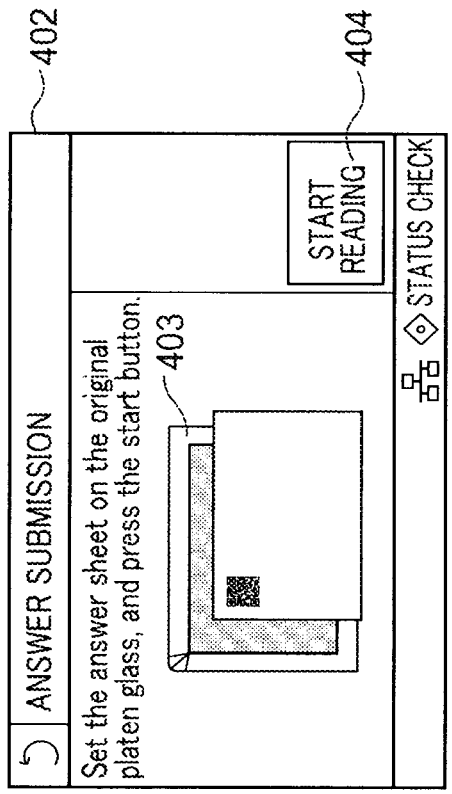
Figure 4B:
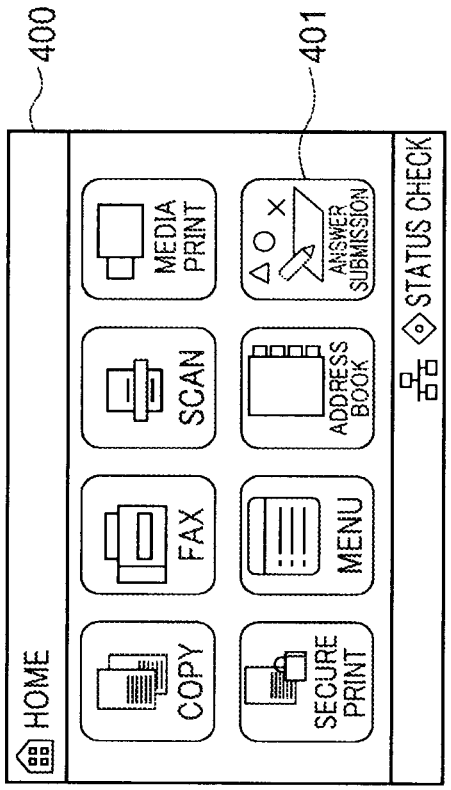

FIG. 3 is a flowchart of an answer sheet submission control process performed by the multifunction peripheral 101 appearing in FIG. 1. The answer sheet submission control process is realized by the CPU 201 of the multifunction peripheral 101, which loads a program stored in the ROM 202 into the RAM 203 and executes the loaded program. In the present embodiment, when a user presses an answer submission button 401 on a menu screen 400 shown in FIG. 4A, which is displayed on the console section 205, the screen on the console section 205 is changed to a scan screen 402 shown in FIG. 4B. The scan screen 402 shows a setting example 403 of an answer sheet on an original platen glass (not shown) of the multifunction peripheral 101. When the user sets an answer sheet on the original platen glass based on the setting example 403 and presses a reading start button 404, the answer sheet submission control process in FIG. 3 is performed.

Referring to FIG. 3, first, the CPU 201 of the multifunction peripheral 101 receives a scan execution instruction from the console section 205 when the reading start button 404 is pressed (step S301). Then, the CPU 201 executes processing for scanning the answer sheet (step S302). More specifically, the CPU 201 instructs the reading section 210 to start scan of the answer sheet via the read controller 209. Upon receipt of the instruction, the reading section 210 reads the set answer sheet and generates a scanned image of the read answer sheet. Then, the CPU 201 transmits the scanned image generated by the reading section 210 to the image processing server 102 (step S303). The image processing server 102 having received the scanned image performs the undesired object area detection process, described hereinafter with reference to FIG. 6. In the undesired object area detection process, the image processing server 102 detects an area/areas of an undesired object/undesired objects from the received scanned image and transmits a completion notification to the effect that the undesired object area detection process is completed and a processed scanned image including information on the detected area(s) of the undesired object(s) to the multifunction peripheral 101.

Upon receipt of the completion notification and the processed scanned image from the image processing server 102 (step S304), the CPU 201 displays a preview screen on the console section 205 (step S305).

For example, in a case where no undesired object area has been detected by the undesired object area detection process performed by the image processing server 102, a preview screen 405 shown in FIG. 4C is displayed on the console section 205. On the preview screen 405, there are displayed a preview image 406 of the scanned image generated by the reading section 210 is displayed. Further, on the preview screen 405, there are displayed a "re-scan" button 407, a "read next original" button 408, and a "assignment submission" button 409. The "re-scan" button 407 is for instructing re-scanning of the answer sheet read in the step S302 without incrementing the number of read sheets. The "read next original" button 408 is for incrementing the number of read sheets and instructing reading of the next original. The "assignment submission" button 409 is for instructing submission of the scanned image.

The CPU 201 determines whether or not the "re-scan" button 407 or the "read next original" button 408 on the preview screen 405 has been pressed by the user (step S306). If it is determined in the step S306 that the "re-scan" button 407 or the "read next original" button 408 on the preview screen 405 has been pressed by the user, the process returns to the step S301. For example, in a case where the "re-scan" button 407 has been pressed by the user, the CPU 201 executes scan processing again with respect to the answer sheet read in the step S302 without incrementing the number of read sheets. In a case where the "read next original" button 408 has been pressed by the user, the CPU 201 increments the number of read sheets and executes scan processing on an answer sheet newly set on the original platen glass, i.e. another answer sheet different from the answer sheet read in the step S302.

If it is determined in the step S306 that neither the "re-scan" button 407 nor the "read next original" button 408 on the preview screen 405 has been pressed, the process proceeds to a step S307. In the step S307, the CPU 201 determines whether or not the "assignment submission" button 409 on the preview screen 405 has been pressed by the user.

When a predetermined time period elapses after it is determined in the step S307 that the "assignment submission" button 409 on the preview screen 405 has not been pressed by the user, the present process is terminated. If it is determined in the step S307 that the "assignment submission" button 409 on the preview screen 405 has been pressed by the user, the CPU 201 displays a charge confirmation screen 410 shown in FIG. 4D on the console section 205 (step S308). On the charge confirmation screen 410, there are displayed the number of read sheets 411, a charged amount 412, and the "assignment submission" button 409. When the CPU 201 receives an input completion notification of the designated amount from the coin vendor 105 (step S309), and the user presses the "assignment submission" button 409 on the charge confirmation screen 410, the process proceeds to a step S310. In the step S310, the CPU 201 transmits the scanned image generated by the reading section 210 to the answer management server 103 as answer data, followed by terminating the present process.

Figure 4E:
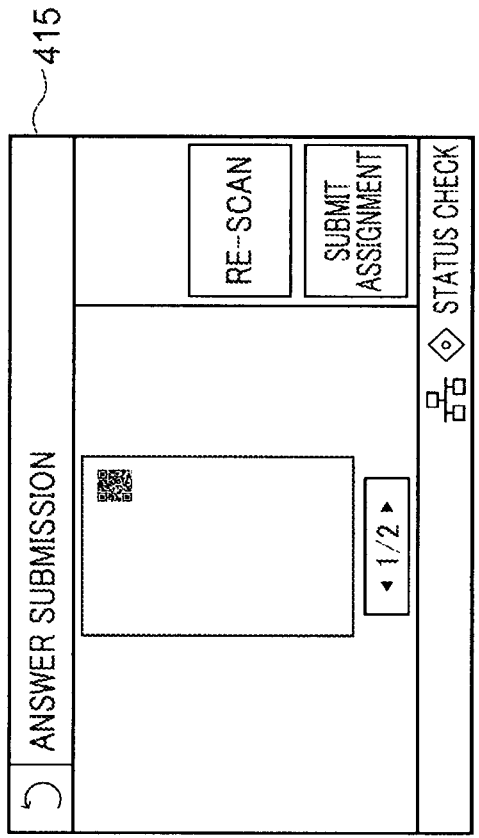

Note that in the present embodiment, when the answer submission button 401 is pressed, a scan screen 414 shown in FIG. 4E, which illustrates an example of setting an answer sheet on an ADF (not shown) of the multifunction peripheral 101, may be displayed on the console section 205. Note that ADF is an abbreviation of automatic document feeder.

Figure 4F:
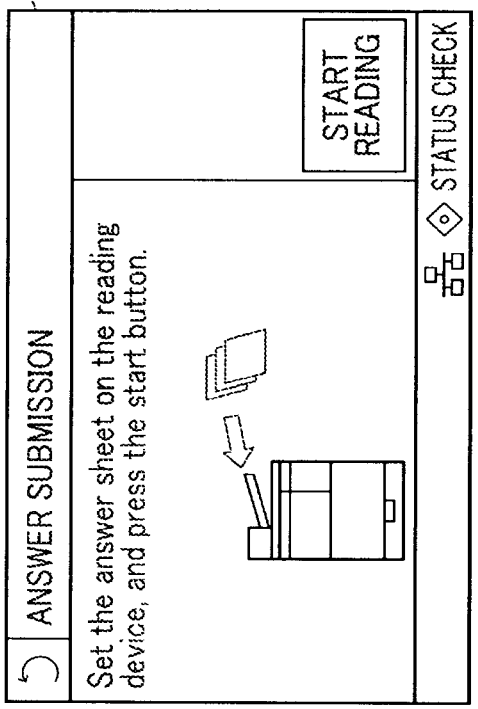

Further, in a case where answer sheets are set on the ADF, in the step S305, the CPU 201 may display a preview screen 415 shown in FIG. 4F on the console section 205, which can switch from one of a plurality of preview images of the read answer sheets to another.

Incidentally, in the present embodiment, in a case where an area of an undesired object is detected by the undesired object area detection process performed by the image processing server 102, in the step S305, a preview screen 501 shown in FIG. 5A is displayed on the console section 205. On the preview screen 501, there are displayed not only the preview image of the scanned image generated by the reading section 210, but also emphasis frames 502 each surrounding a detected undesired object area shown therein and a warning notification 503 prompting a user to confirm the undesired object. In a case where the user having confirmed the preview screen 501 judges that it is necessary to re-scan the answer sheet, the user can replace the scanned image to be submitted with a scanned image generated by re-scanning the answer sheet by pressing a "re-scan" button 504.

Figure 5B:
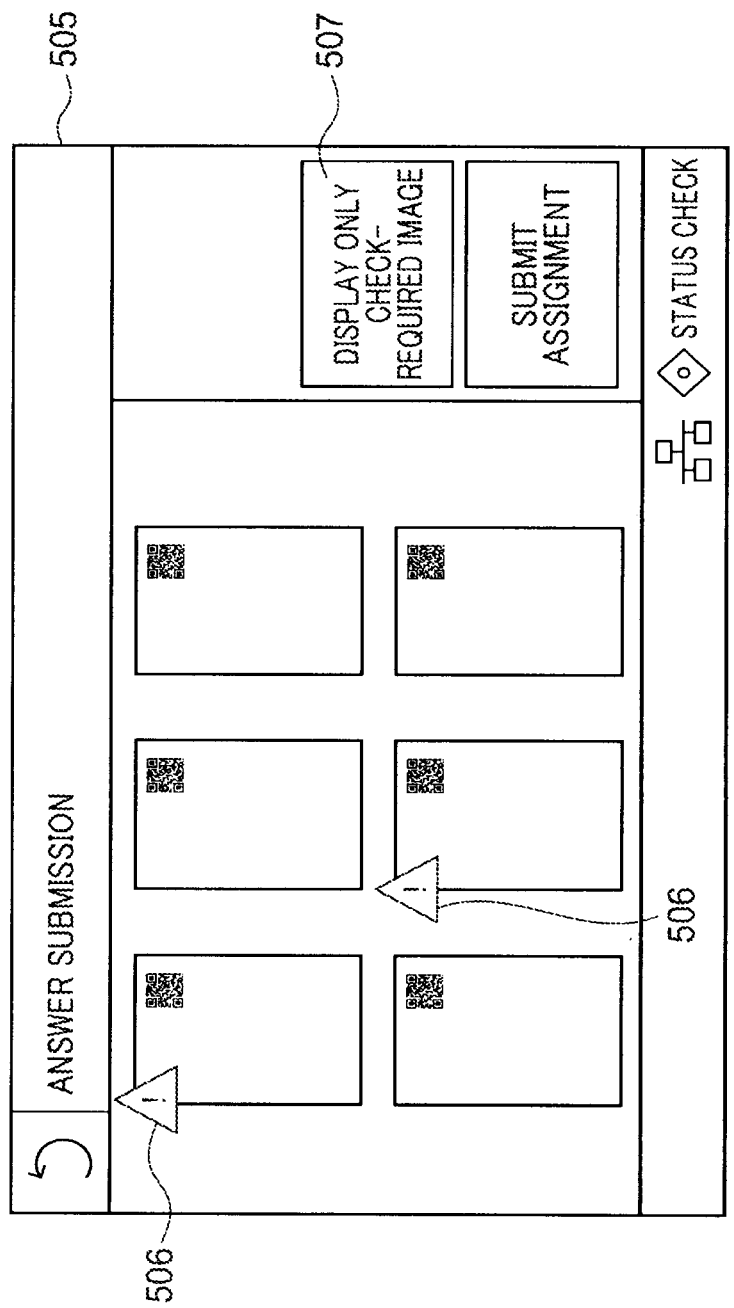

Note that in the present embodiment, in a case where a plurality of answer sheets have been read, in the step S305, the preview images may be displayed in a list as indicated by a preview screen 505 shown in FIG. 5B. In this case, a check requirement mark 506 may be displayed in the vicinity of the preview image of a scanned image from which an undesired object area is detected. With this, out of the plurality of read answer sheets, the user can easily identify an answer sheet including an undesired object. Further, as another method, only a message, such as "Check an image on the front or reverse side of the n-th sheet", may be simply displayed without displaying the check requirement mark 506.

Figure 5D:
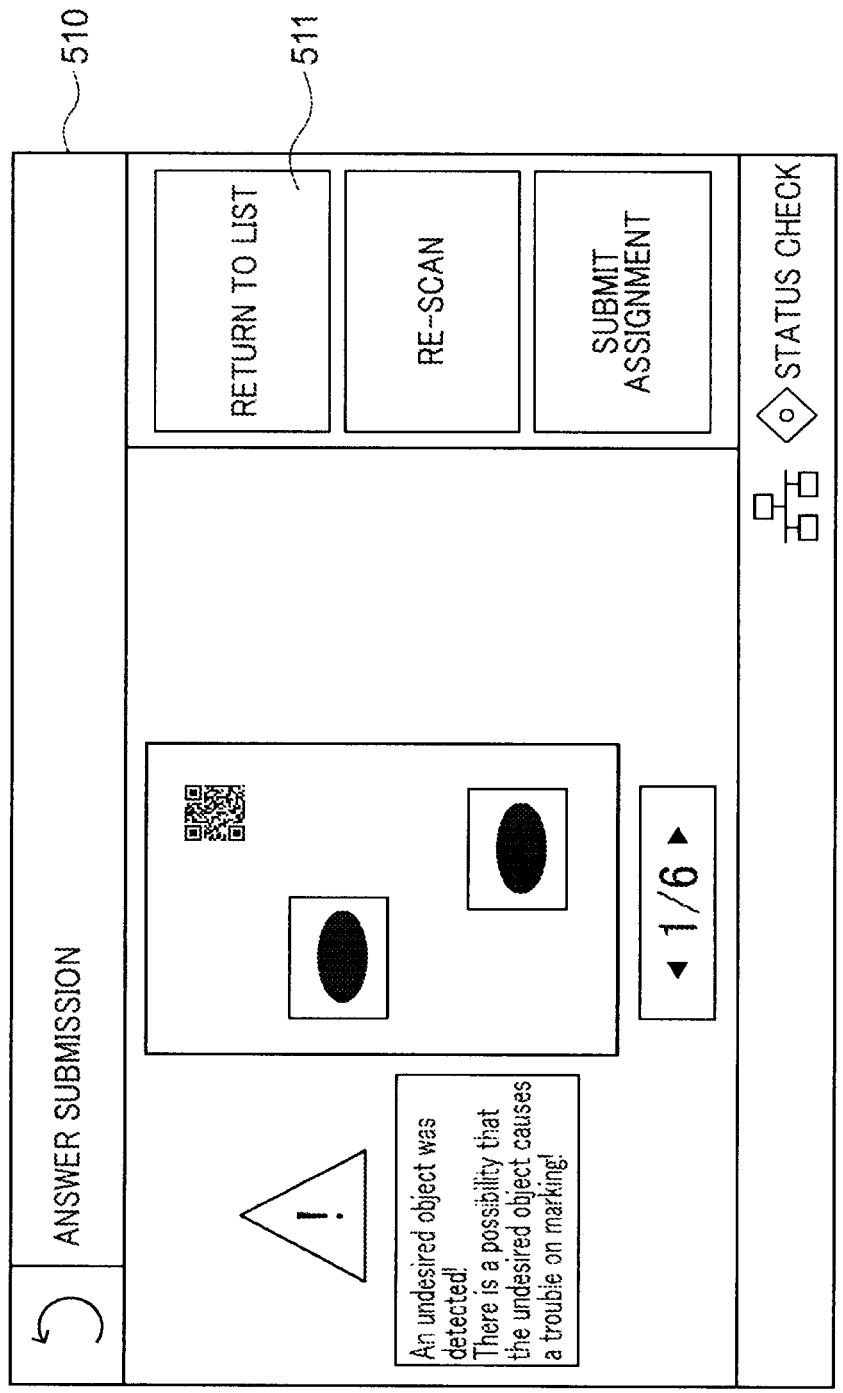

When the user presses a "display only check-required image" button 507 on the preview screen 505, the screen on the console section 205 is changed to a preview screen 508 shown in FIG. 5C. On the preview screen 508, out of the plurality of preview images displayed on the preview screen 505, only the preview images of the scanned images from each of which an undesired object area has been detected are displayed. When the user presses a "display all images" button 509 on the preview screen 508, the screen on the console section 205 is changed to the preview screen 505. For example, when the user selects one of the preview images on the preview screen 505 or the preview screen 508, a preview screen 510 shown in FIG. 5D, which is comprised of the selected preview image, is displayed. On the preview screen 510, there is displayed a "return to list" button 511 for returning the screen to the display of the list of preview images, such as the preview screen 505 or the preview screen 508. With this, it is possible to easily switch between the preview screen displaying the list of preview images and the preview screen comprised of one preview image. Note that the control for determining whether or not to display the above-mentioned emphasis frame 502, the warning notification 503, and the check requirement mark 506 is performed based on the completion notification received from the image processing server 102 and the contents of the processed scanned image.

Figure 6:
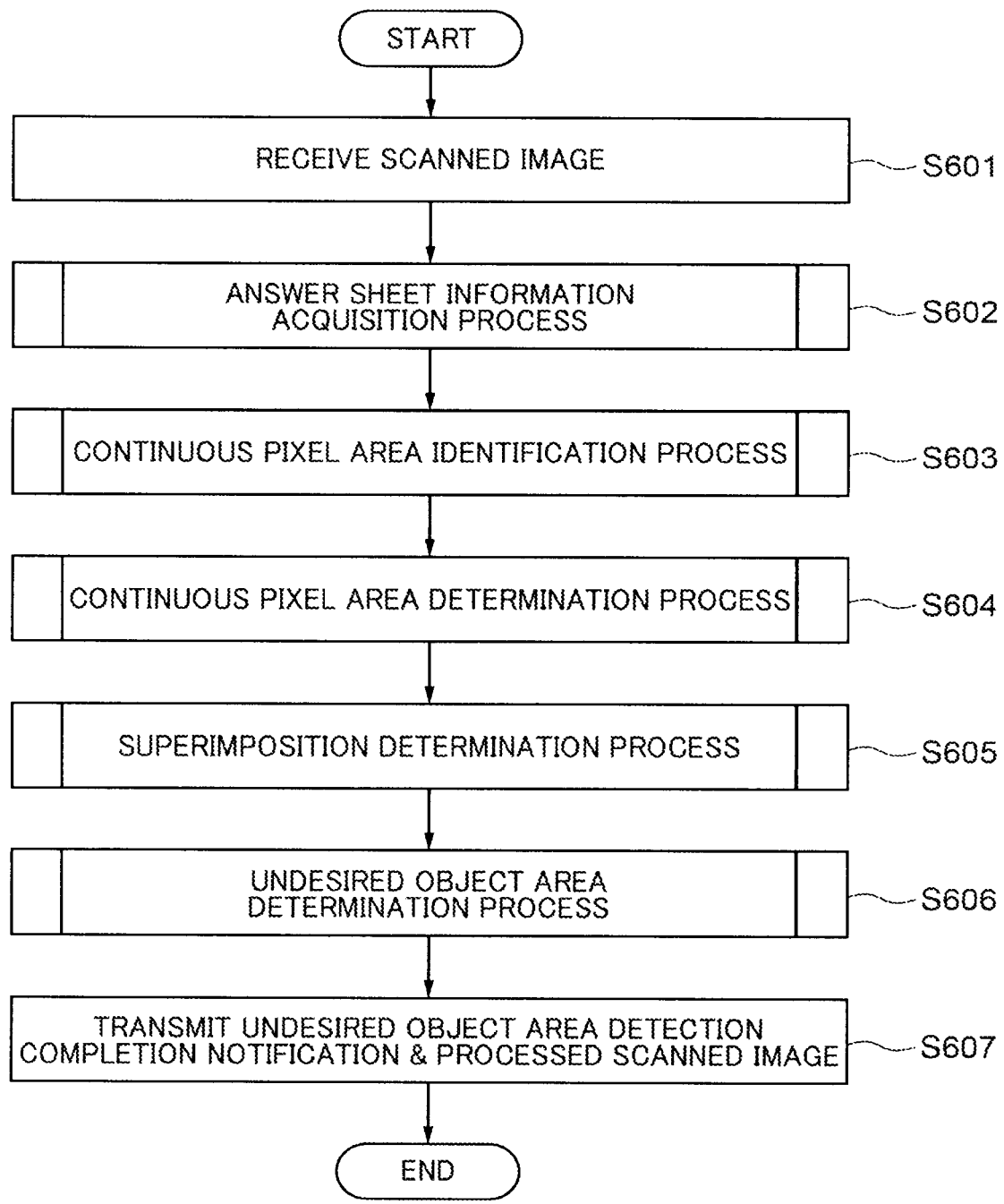
FIG. 6 is a flowchart of an undesired object area detection process performed by the image processing server appearing in FIG. 1.

FIG. 6 is a flowchart of the undesired object area detection process performed by the image processing server 102 appearing in FIG. 1. The undesired object area detection process in FIG. 6 is realized by the CPU of the controller 212 of the image processing server 102, which loads a program stored in the ROM into the RAM and executes the loaded program.

Figure 7A:
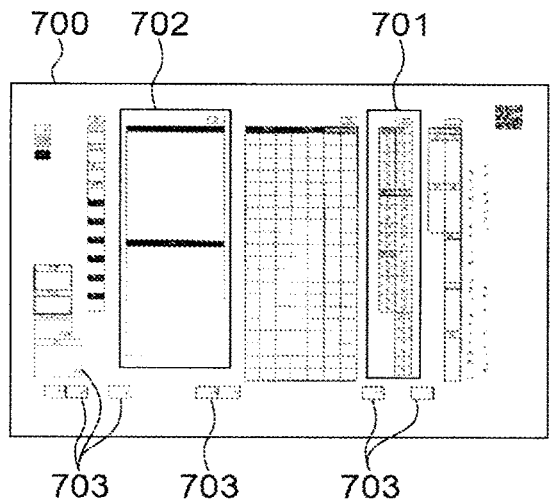
FIGS. 7A to 7F are diagrams each showing an example of data used by the image processing server appearing in FIG. 1.

Referring to FIG. 6, first, the controller 212 receives a scanned image from the multifunction peripheral 101 (step S601). Then, the controller 212 performs an answer sheet information acquisition process, described hereinafter with reference to FIG. 8A, (step S602), to acquire answer sheet information. The answer sheet information includes coordinate information indicating positions of answer fields and marking fields on the answer sheet, a template image of the answer sheet, and the like. In the present embodiment, it is assumed that a template image of an answer sheet 700 shown in FIG. 7A has been acquired, by way of example. The answer sheet 700 includes a computer-scored answer field 701, a drawing question answer field 702, and marking fields 703. The computer-scored answer field 701 is an answer field of areas each in a computer-scored answer form having six choices. In the computer-scored answer field 701, answering is performed by filling in one of each six choices. The drawing question answer field 702 is an answer field in a drawing form, and answering is performed by illustrating contents instructed by a questioner, within the field. Each marking field 703 is a field for writing a result of marking.

Then, the controller 212 performs a continuous pixel area identification process, described hereinafter with reference to FIG. 8B, (step S603), to identify continuous pixel areas each of which includes a plurality of pixels whose pixel values are higher than the predetermined density threshold value and has an area size equal to or larger than the predetermined value. Then, the controller 212 performs a continuous pixel area determination process, described hereinafter with reference to FIG. 9A, (step S604), to determine whether or not any identified continuous pixel area exists in the template image of the answer sheet. Then, the controller 212 performs a superimposition determination process, described hereinafter with reference to FIG. 9B, (step S605), to determine whether or not a continuous pixel area determined not to exist in the template image of the answer sheet is superimposed on any of the answer field areas and the marking field areas. Then, the controller 212 performs an undesired object area determination process, described hereinafter with reference to FIG. 10, (step S606), to determine whether or not a continuous pixel area determined not to exist in the template image of the answer sheet is an area of an undesired object. Then, the controller 212 transmits a completion notification to the effect that the undesired object area detection process is completed and the processed scanned image, to the multifunction peripheral 101 (step S607), followed by terminating the present process.

Figure 8A:
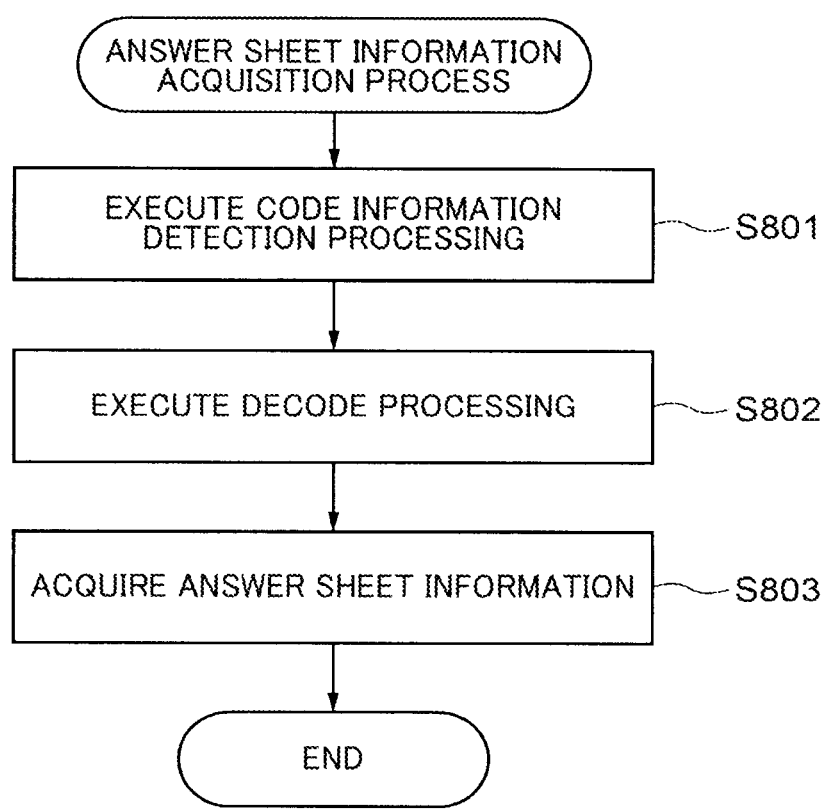
FIG. 8A is a flowchart of an answer sheet information acquisition process performed in a step in FIG. 6.

FIG. 8A is a flowchart of the answer sheet information acquisition process performed in the step S602 in FIG. 6.

Referring to FIG. 8A, the controller 212 performs code information detection processing on the scanned image received from the multifunction peripheral 101 (step S801). In the present embodiment, code information including information for identifying an answer sheet type is printed on the answer sheet. The code information is e.g. a QR code (registered trademark) or a barcode. By the code information detection processing, the code information is detected from the scanned image. Then, the controller 212 executes decode processing on the detected code information (step S802). Then, the controller 212 identifies a type of the answer sheet based on the code information. The controller 212 acquires coordinate information which indicates positions of the answer fields and the marking fields on the answer sheet of the identified type and answer sheet information which includes the template image of the answer sheet and the like, from the answer management server 103 (step S803), followed by terminating the present process.

Figure 7B:
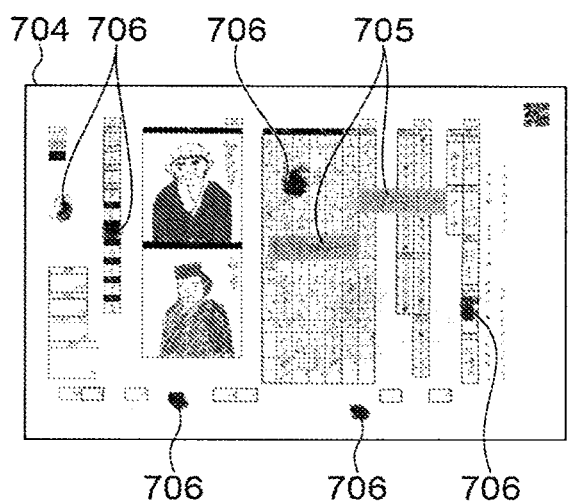
Figure 8B:
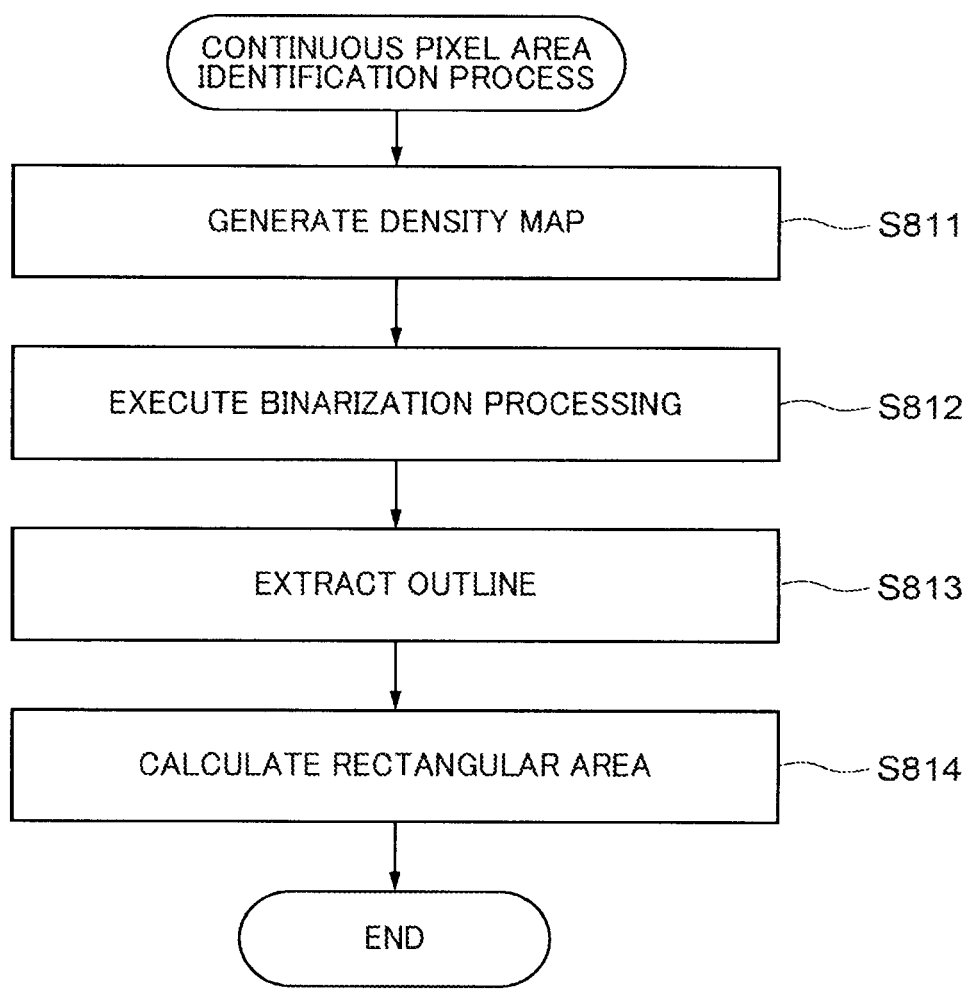
FIG. 8B is a flowchart of a continuous pixel area identification process performed in a step in FIG. 6.

FIG. 8B is a flowchart of the continuous pixel area identification process performed in the step S603 in FIG. 6. In the present embodiment, a case where a scanned image of an answer sheet 704 shown in FIG. 7B, on which answers have been written, is received from the multifunction peripheral 101 will be described, by way of example. To the answer sheet 704, slips 705 are attached and dirt 706 adheres, as examples of the undesired object.

Figure 7C:
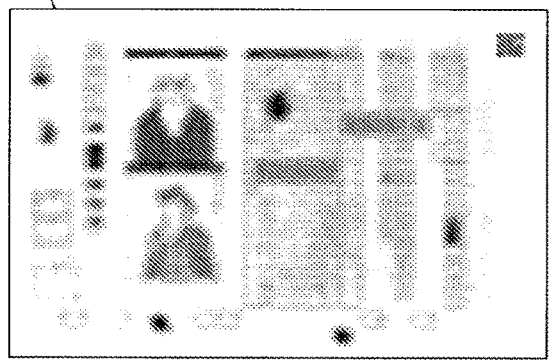

Referring to FIG. 8B, the controller 212 generates a density map using the scanned image received from the multifunction peripheral 101 (step S811). The density map is an image (average density image) generated by integrating pixel values in areas each having an area size from which a continuous pixel area portion is desired to be detected, and changing all pixels to a pixel value obtained by multiplying by 100 a quotient obtained by dividing the resulting value of the above integration by an integrated value obtained assuming that all the pixels in the above-mentioned area have the maximum density. This makes it possible to indicate an average density in the target area by a value in a range of 0 to 100%, and roughly speaking, it is possible to acquire the continuity of pixels. Note that a threshold value of the area size of an area from which a continuous pixel area portion is desired to be detected may be set to a fixed value, or may be changeable. An image 707 shown in FIG. 7C is an example of the density map generated in the step S811. Although in FIG. 7C, the image is blurred as a whole, this is because each average density image of the answer sheet is generated from an area of 4 mm×4 mm, by way of example. In the density map, each density value is calculated by averaging pixel values on a block unit basis, and hence the image is reduced in size from the original image, and the detailed outline information of the image is lost since the density values are averaged density values.

Figure 7D:
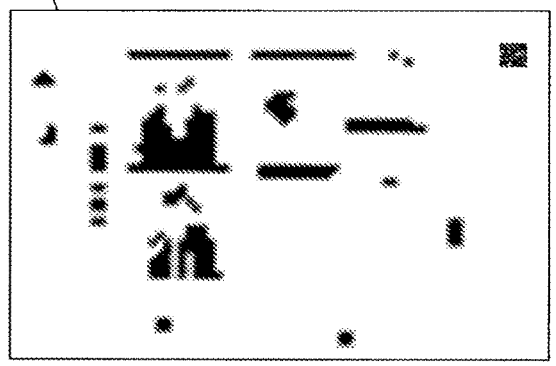

Then, the controller 212 performs binarization processing on the density map (step S812). Note that a binarization threshold value may be a fixed value, or may be a value calculated e.g. by the Otsu's method. By performing binarization processing, it is possible to eliminate low-density areas which do not block marking from the scanned image. An image 708 shown in FIG. 7D is an example of the density map obtained in the step S812, on which the binarization processing has been performed. In the image 708, the low-density areas in the image 707 before the binarization processing have been eliminated, and intermediate to high density areas in the image 707 have been converted to maximum density areas.

Figure 7E:
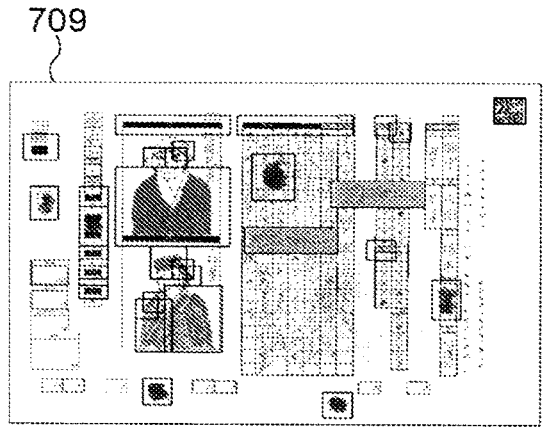

Then, the controller 212 performs outline extraction on the binarized density map (step S813). In processing for the outline extraction, a method provided e.g. by a general image processing library, such as Open CV, is used. Then, the controller 212 performs rectangular area calculation on a result of the outline extraction (step S814). In the rectangular area calculation, a method provided e.g. by a general image processing library is used. In the present embodiment, rectangular areas calculated in the step S814 are used as continuous pixel areas. An image 709 shown in FIG. 7E shows a result of combining the rectangular areas calculated by the processing in the step S814 with the scanned image. In the image 709, there are drawn the rectangular areas (continuous pixel areas) each containing an area indicated by black in the image 708 which is the binarized density map, followed by terminating the present process.

With the above-described continuous pixel area identification process, it is possible to identify, from a scanned image of an answer sheet, continuous pixel areas each of which includes a plurality of pixels whose pixel values are higher than the predetermined density threshold value and has an area size equal to or larger than the predetermined value. Note that each continuous pixel area is assumed to be a rectangular area formed by the number of pixels which are fixedly or dynamically designated. The continuous pixel area having an area size equal to or larger than the predetermined value is acquired by integrating pixel values in areas from which the continuous pixel area is desired to be detected, thereafter, based on the integrated pixels values, extracting density values higher than the density threshold value, and, based on judgment on continuity by outline extraction, determining a rectangular area surrounding the continuous pixel area. Although in the present embodiment, a rectangular area surrounding an outline extraction result is defined as the continuous pixel area, the outline extraction result may be directly used as the continuous pixel area. Further, as another method of determining a continuous pixel area, there may be employed a method of simply scanning pixels, counting the number of pixels each having a pixel value exceeding the density threshold value in a main scanning direction and in a sub scanning direction, respectively, and determining an area in which the count in the main scanning direction and the count in the sub scanning direction are equal to or larger than respective predetermined numbers.

Figure 9A:
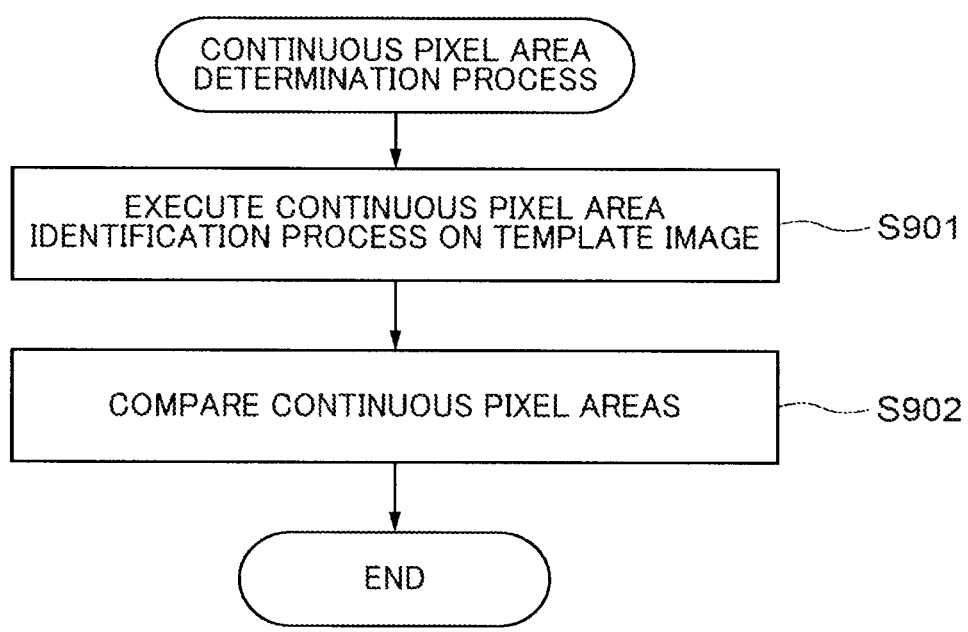
FIG. 9A is a flowchart of a continuous pixel area determination process performed in a step in FIG. 6.

FIG. 9A is a flowchart of the continuous pixel area determination process performed in the step S604 in FIG. 6.

Referring to FIG. 9A, the controller 212 performs the above-described continuous pixel area identification process on the template image, acquired in the step S803, of the answer sheet (step S901). Then, the controller 212 compares the continuous pixel areas detected from the scanned image received from the multifunction peripheral 101 and the continuous pixel areas detected from the template image of the answer sheet (step S902). For example, in a case where a plurality of continuous pixel areas are detected from a scanned image received from the multifunction peripheral 101, the controller 212 selects one continuous pixel area out of the plurality of continuous pixel areas. The controller 212 determines whether or not the selected continuous pixel area matches any of the continuous pixel areas detected from the template image of the answer sheet. In this determination, the controller 212 may simply check coincidence of the start point and size of each continuous pixel area between the compared areas, or alternatively may check that a difference in the center coordinates of each continuous pixel area between the compared areas or a difference in the area size of each continuous pixel area between the compared areas is within a threshold value. The controller 212 performs the above-described determination processing on all of the continuous pixel areas detected from the scanned image received from the multifunction peripheral 101. After that, the present process is terminated.

With the above-described continuous pixel area determination process, it is possible to determine whether or not a continuous pixel area detected from a scanned image received from the multifunction peripheral 101 exists in the template image of the answer sheet.

Note that in the present embodiment, information on the continuous pixel areas detected from the template image of the answer sheet may be included in the answer sheet information acquired in the step S803. In a case where this answer sheet information is acquired from the answer management server 103, the controller 212 executes the step S902 using the information included in the answer sheet information acquired from the answer management server 103 without executing the step S901. This makes it possible to reduce the processing load of the image processing server 102 in execution of the undesired object area detection process.

Figure 9B:
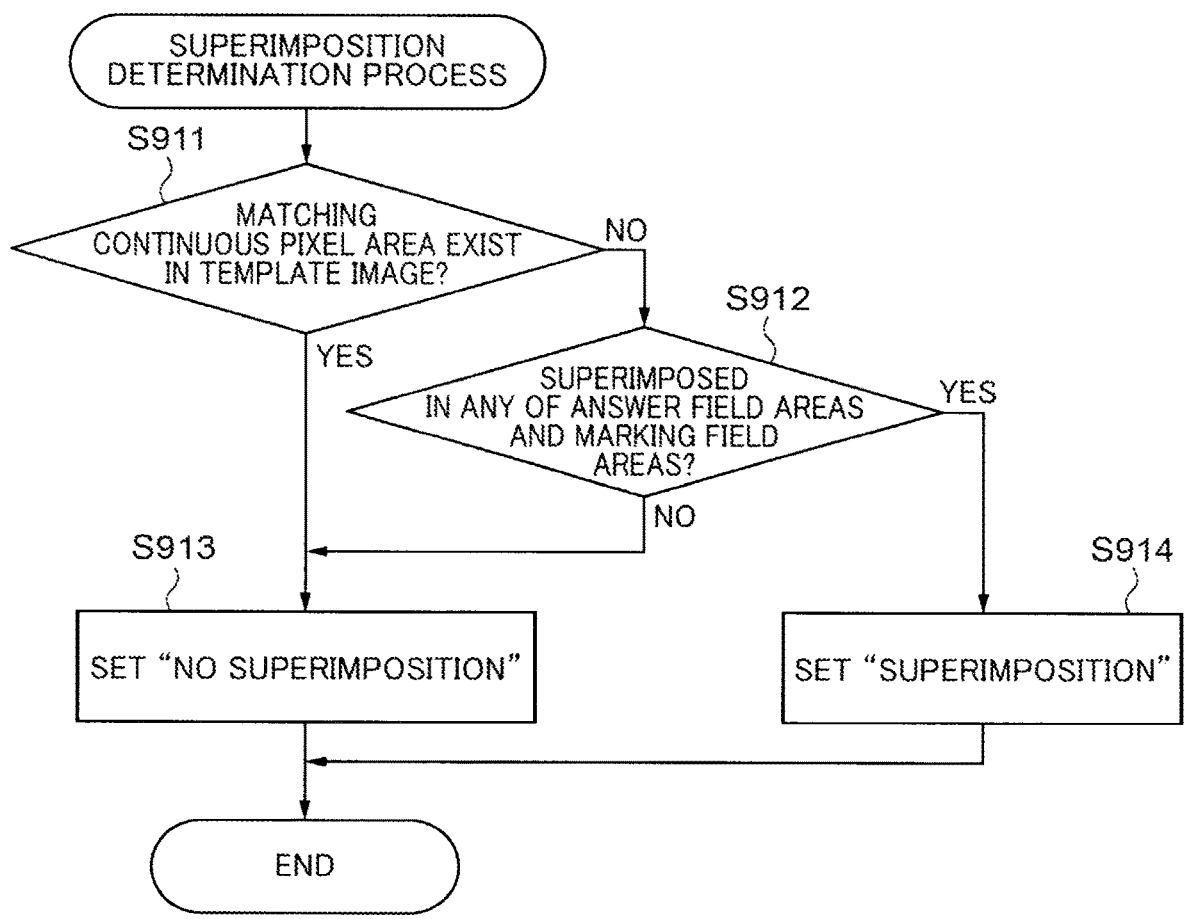
FIG. 9B is a flowchart of a superimposition determination process performed in a step in FIG. 6.

FIG. 9B is a flowchart of the superimposition determination process performed in the step S605 in FIG. 6. The superimposition determination process is performed on all of the continuous pixel areas detected from the scanned image received from the multifunction peripheral 101. With reference to FIG. 9B, a description will be given, by way of example, of a case where the superimposition determination process is performed on one continuous pixel area selected from the continuous pixel areas detected from the scanned image received from the multifunction peripheral 101.

Referring to FIG. 9B, the controller 212 determines, based on a result of the comparison in the step S902, whether or not a continuous pixel area matching the selected continuous pixel area exists in the template image of the answer sheet (step S911).

If it is determined in the step S911 that a continuous pixel area matching the selected continuous pixel area exists in the template image of the answer sheet, the process proceeds to a step S913, described hereinafter. On the other hand, if it is determined in the step S911 that no continuous pixel area matching the selected continuous pixel area exists in the template image of the answer sheet, the process proceeds to a step S912.

In the step S912, the controller 212 determines whether or not the selected continuous pixel area is superimposed on any of the answer field areas and the marking field areas. In the step S912, for example, when determining superimposition on an answer field area, the controller 212 calculates a difference between the center coordinates of the selected continuous pixel area and the center coordinates of the answer field area. In a case where a difference in the main scanning direction out of the calculated differences is equal to or smaller than the sum of the respective half widths of these areas, and further, a difference in the sub scanning direction out of the calculated differences is equal to or smaller than the sum of the respective half heights of these areas, it is determined that the selected continuous pixel area is superimposed on the answer field area. On the other hand, in a case where the above-mentioned condition is not satisfied, it is determined that the selected continuous pixel area is not superimposed on the answer field area. Note that the same method is applied to determination of superimposition on a marking field.

If it is determined in the step S912 that the selected continuous pixel area is not superimposed on any of the answer field areas and the marking field areas, the process proceeds to the step S913. In the step S913, the controller 212 sets the selected continuous pixel area to "no superimposition" indicating that the continuous pixel area is not superimposed on any of the answer field areas and the marking field areas, followed by terminating the present process.

If it is determined in the step S912 that the selected continuous pixel area is superimposed on one of the answer field areas and the marking field areas, the process proceeds to a step S914. In the step S914, the controller 212 sets the selected continuous pixel area to "superimposition" indicating that the continuous pixel area is superimposed on one of the answer field areas and the marking field areas, followed by terminating the present process.

With the above-described superimposition determination process, it is possible to determine whether or not a continuous pixel area detected from a scanned image received from the multifunction peripheral 101 is superimposed on any of the answer field areas and the marking field areas.

Figure 10:
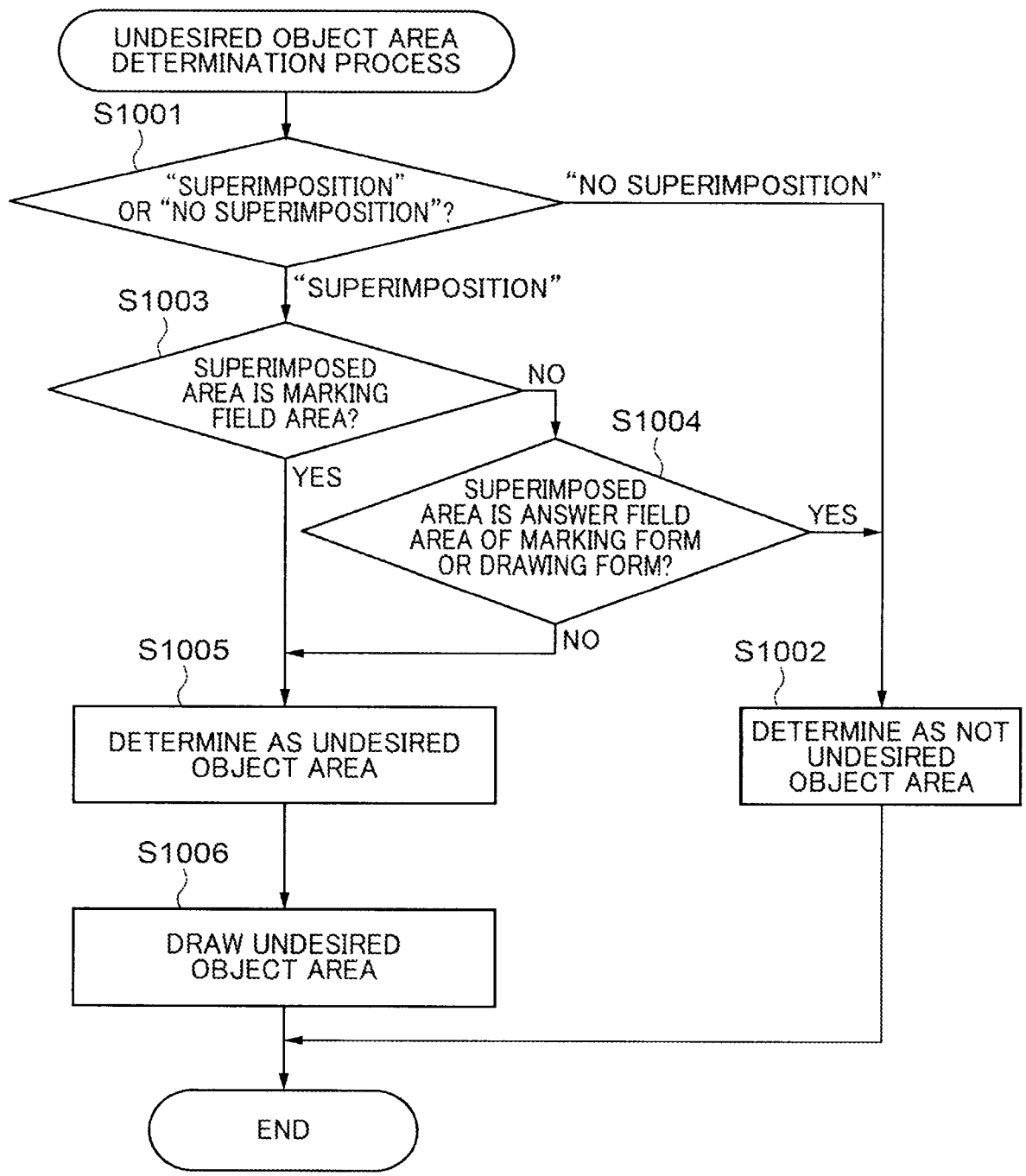
FIG. 10 is a flowchart of an undesired object area determination process performed in a step in FIG. 6.

FIG. 10 is a flowchart of the undesired object area determination process performed in the step S606 in FIG. 6. The undesired object area determination process is performed on all of the continuous pixel areas detected from the scanned image received from the multifunction peripheral 101. With reference to FIG. 10, a description will be given, by way of example, of a case where the undesired object area determination process is performed on one continuous pixel area selected from the continuous pixel areas detected from the scanned image received from the multifunction peripheral 101.

Referring to FIG. 10, the controller 212 determines to which of "superimposition" and "no superimposition", the selected continuous pixel area is set by the superimposition determination process in the step S605 (step S1001). If it is determined in the step S1001 that the selected continuous pixel area is set to "no superimposition" by the superimposition determination process in the step S605, the process proceeds to a step S1002. In the step S1002, the controller 212 determines that the selected continuous pixel area is not an area of an undesired object, followed by terminating the present process.

If it is determined in the step S1001 that the selected continuous pixel area is set to "superimposition" by the superimposition determining process in the step S605, the process proceeds to a step S1003. In the step S1003, the controller 212 determines whether or not the area on which the selected continuous pixel area is superimposed is a marking field area.

If it is determined in the step S1003 that the area on which the selected continuous pixel area is superimposed is a marking field area, the process proceeds to a step S1005, described hereinafter. On the other hand, if it is determined in the step S1003 that the area on which the selected continuous pixel area is superimposed is not a marking field area, the area on which the selected continuous pixel area is superimposed is determined to be an answer field area. In this case, the process proceeds to a step S1004. In the step S1004, the controller 212 determines whether the answer form of the answer field area on which the selected continuous pixel area is superimposed is the computer-scored answer form or the drawing form.

Figure 7F:
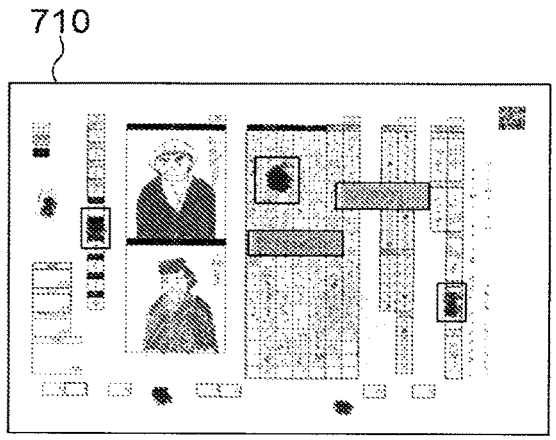

If it is determined in the step S1004 that the answer form of the answer field area on which the selected continuous pixel area is superimposed is neither the computer-scored answer form nor the drawing form, the process proceeds to the step S1005. In the step S1005, the controller 212 determines the selected continuous pixel area as an undesired object area. Then, the controller 212 draws the undesired object area on the scanned image received from the multifunction peripheral 101 (step S1006). An image 710 shown in FIG. 7F shows an example of the scanned image on which each undesired object area has been drawn in the step S1006. In the step S1006, a frame of the continuous pixel area determined as the undesired object area is highlighted in a conspicuous color, such as red, and a thickness which can be easily recognized by the user, followed by terminating the present process.

If it is determined in the step S1004 that the answer form of the answer field area on which the selected continuous pixel area is superimposed is the computer-scored answer form or the drawing form, the process proceeds to the step S1002. That is, in the present embodiment, in a case where the answer form of the answer field area on which the selected continuous pixel area is superimposed is the computer-scored answer form or the drawing form, this continuous pixel area is not drawn as an undesired object area in the scanned image. With this, it is possible to prevent, out of the continuous pixel areas detected from the scanned image, ones assumed to be areas on each of which a user wrote an answer, from being notified to the user as undesired object areas.

Note that in the present embodiment, in the step S1006 of the undesired object area determination process, not a rectangular area, but a continuous pixel area obtained by outline extraction may be drawn.

Figure 11:
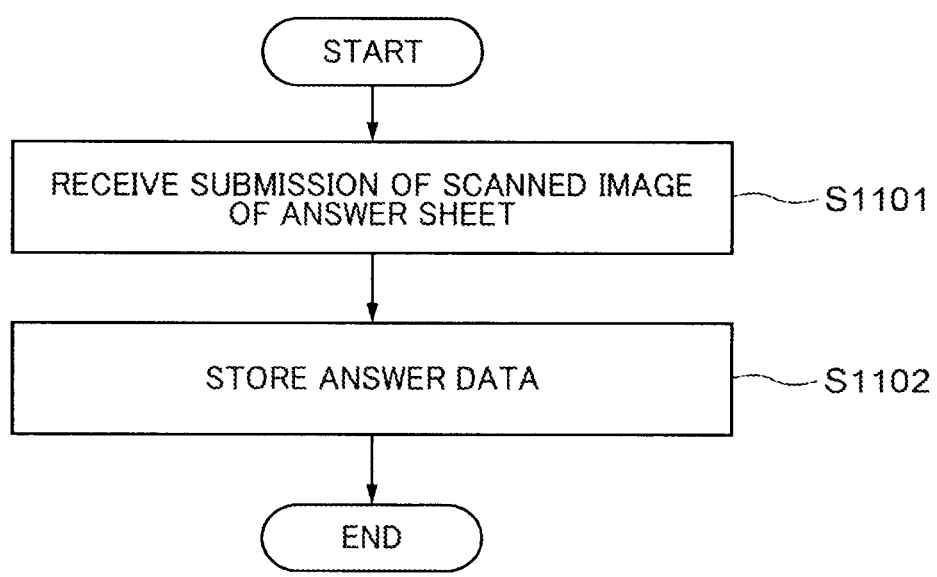
FIG. 11 is a flowchart of an answer data-storing process performed by an answer management server appearing in FIG. 1.

FIG. 11 is a flowchart of an answer data-storing process performed by the answer management server 103 appearing in FIG. 1.

Referring to FIG. 11, the answer management server 103 receives submission of a scanned image of an answer sheet on which answers have been written from the multifunction peripheral 101 (step S1101). Then, the answer management server 103 stores the scanned image received from the multifunction peripheral 101 as answer data (step S1102), followed by terminating the present process.

According to the above-described embodiment, a continuous pixel area including a plurality of pixels whose pixel values are higher than the predetermined density threshold value and having an area size equal to or larger than the predetermined value is identified from a scanned image, and whether or not the identified continuous pixel area is an area of an undesired object which obstructs visibility is determined. A continuous pixel area determined as an undesired object area is notified to a user before submitting the scanned image to the answer management server 103. This makes it possible to give a user an opportunity to notice that the undesired object which obstructs visibility is included in an original before submitting the scanned image of this original. As a result, it is possible to prevent resubmission of the scanned image from being required due to the undesired object.

Further, in the above-described embodiment, the scanned image is an image generated by reading an answer sheet on which answers have been written. With this, in the configuration in which the scanned image of the answer sheet is submitted to the answer management server 103, it is possible to prevent resubmission of the scanned image from being required due to an undesired object.

In the above-described embodiment, a scanned image, and a template image generated by reading an answer sheet on which no answers have been written, are compared to determine whether or not each continuous pixel area is an area of an undesired object. With this, it is possible to determine whether each continuous pixel area is generated by dirt adhering to the answer sheet or a slip or the like affixed to the answer sheet, or is an area which has been originally printed on the answer sheet.

In the above-described embodiment, a continuous pixel area determined not to exist in the template image of the answer sheet and is superimposed on a marking field area is determined as an undesired object area. With this, it is possible to give a user an opportunity to notice that the undesired object exists in the marking field before transmitting the scanned image of the answer sheet.

Further, in the above-described embodiment, a continuous pixel area which is determined not to exist in the template image of the answer sheet and is superimposed on an answer field area in an answer form other than the drawing form and the computer-scored answer form is determined as an undesired object area. With this, it is possible to give a user an opportunity to notice that the undesired object exists in the answer field in the answer form other than the drawing form and the computer-scored answer form before transmitting the scanned image of the answer sheet.

Although in the present embodiment, the image processing server 102 executes the undesired object area detection process, this is not limitative. For example, the multifunction peripheral 101 may include the answer sheet information acquisition section 213, the continuous pixel area identification section 214, the continuous pixel area existence determination section 215, the superimposition determination section 216, and the undesired object area determination section 217, and may execute the above-described undesired object area detection process. In this configuration as well, it is also possible to obtain the same advantageous effects as provided by the above-described embodiment.

Further, in the present embodiment, an instruction for correcting a detected undesired object area may be received from a user.

In the above-described embodiment, when an undesired object area is detected from a scanned image generated by reading an answer sheet, the undesired object area is notified to a user before submitting the scanned image to the answer management server 103. The user having received this notification eliminates an object as a cause of the undesired object area and then re-scans the answer sheet. Here, in a case where the undesired object area is generated by attachment of a slip or the like, by re-scanning the answer sheet from which the slip or the like is removed, it is possible to obtain a scanned image from which the undesired object area is not detected. However, in a case where the undesired object area is generated by adhesion of dirt, the dirt cannot sometimes be completely eliminated. When the answer sheet from which the dirt has not been completely eliminated is re-scanned, the undesired object area remains in the scanned image obtained by re-scanning, and even when this answer sheet is submitted, there is a high possibility that resubmission of the answer sheet is required, causing more charged amount.

To cope with this, in the present embodiment, an instruction for correcting a detected undesired object area is received from a user.

Figure 12:
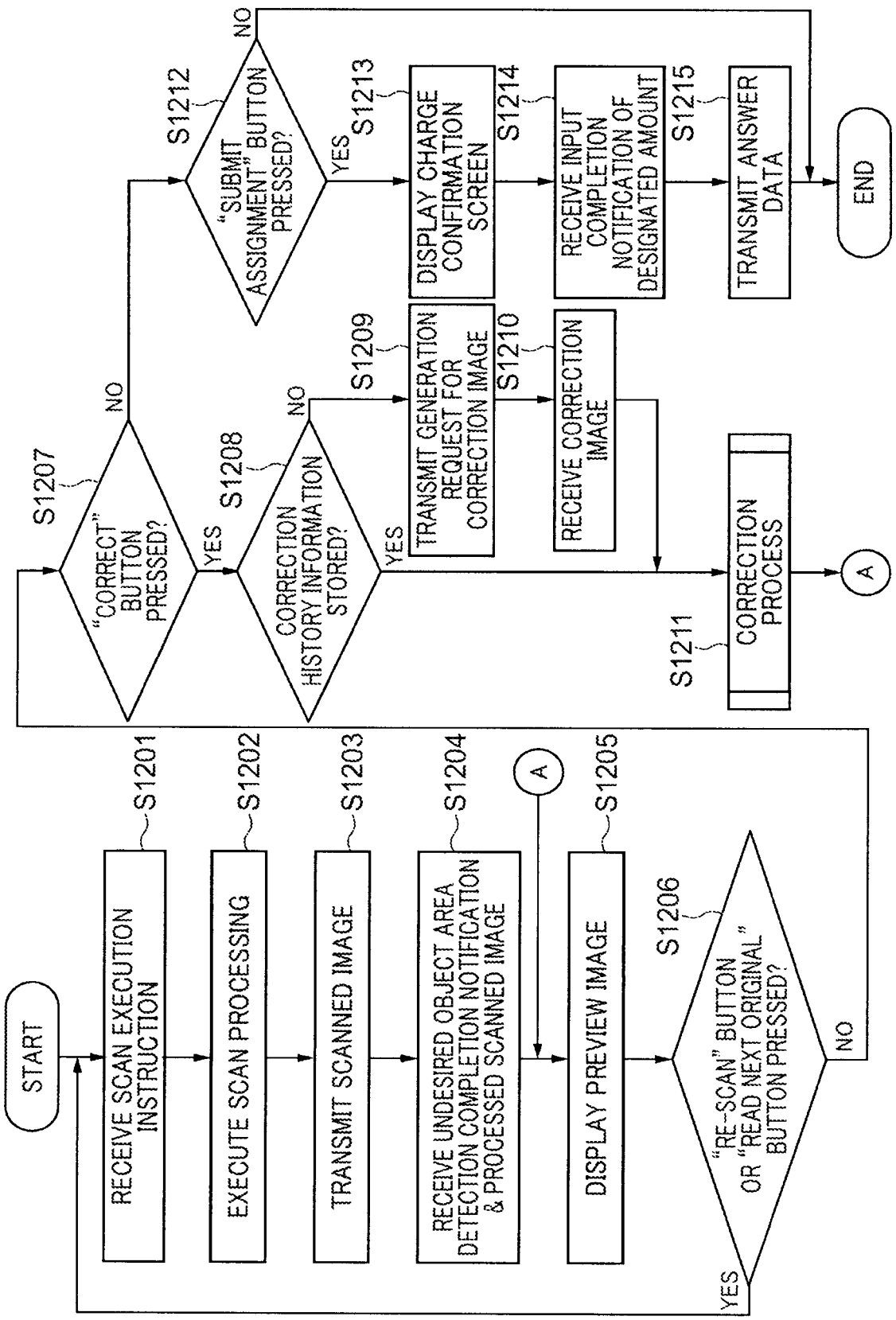
FIG. 12 is a flowchart of a variation of the answer sheet submission control process performed by the multifunction peripheral appearing in FIG. 1.

FIG. 12 is a flowchart of a variation of the answer sheet submission control process performed by the multifunction peripheral 101 appearing in FIG. 1. The answer sheet submission control process in FIG. 12 is a process similar to the answer sheet submission control process in FIG. 3, and the following description will be given mainly of different points from the answer sheet submission control process in FIG. 3. Similar to the answer sheet submission control process in FIG. 3, the answer sheet submission control process in FIG. 12 is also realized by the CPU 201 that loads a program stored in the ROM 202 into the RAM 203 and executes the loaded program. Further, similar to the answer sheet submission control process in FIG. 3, the answer sheet submission control process in FIG. 12 is also executed when a user sets an answer sheet on the original platen glass based on the setting example 403 and presses the reading start button 404.

Figure 13A:
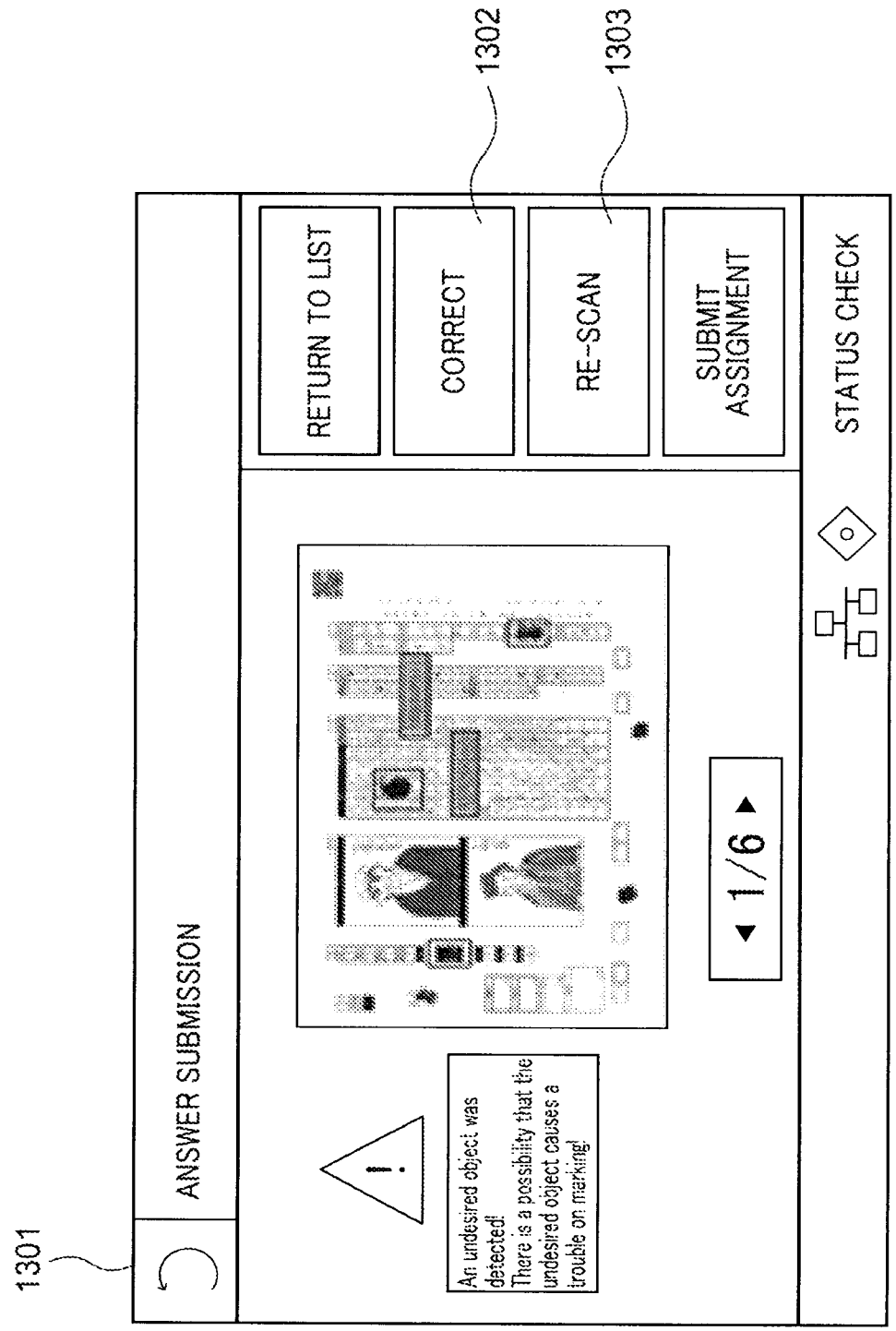

Referring to FIG. 12, first, the CPU 201 executes steps S1201 to S1204 which are the same as the above-described steps S301 to S304. Then, the CPU 201 displays a preview screen 1301 shown in FIG. 13A on the console section 205 (step S1205). The preview screen 1301 is similar to the preview screen 501 but differs from the preview screen 501 in that a "correct" button 1302 is included. When the user presses the "correct" button 1302, this makes it possible to edit a correction image, described hereinafter, generated based on the scanned image of the answer sheet. Then, the CPU 201 executes a step S1206 which is the same as the step S306. If it is determined in the step S1206 that a "re-scan" button 1303 or a "read next original" button, not shown, on the preview screen 1301 has been pressed by the user, the process returns to the step S1201. If it is determined in the step S1206 that neither the "re-scan" button 1303 nor the "read next original" button on the preview screen 1301 has been pressed by the user, the process proceeds to a step S1207.

In the step S1207, the CPU 201 determines whether or not the "correct" button 1302 on the preview screen 1301 has been pressed by the user.

If it is determined in the step S1207 that the "correct" button 1302 on the preview screen 1301 has been pressed by the user, the process proceeds to a step S1208. In the step S1208, the CPU 201 determines whether or not correction history information concerning the scanned image has been stored in the RAM 203.

If it is determined in the step S1208 that no correction history information concerning the scanned image has been stored in the RAM 203, the process proceeds to a step S1209. In the step S1209, the CPU 201 transmits a request for generating a correction image to the image processing server 102. The image processing server 102 having received the correction image generation request performs a correction image generating process, described hereinafter with reference to FIG. 14, and transmits the generated correction image to the multifunction peripheral 101. The CPU 201 receives the correction image from the image processing server 102 (step S1210) and stores the received correction image in the RAM 203. Then, the process proceeds to a step S1211.

If it is determined in the step S1208 that the correction history information concerning the scanned image has been stored in the RAM 203, it implies that a correction image for correcting the scanned image has already been stored in the RAM 203. In this case, the process directly proceeds to the step S1211, wherein the CPU 201 performs a correction process, described hereinafter with reference to FIG. 15, to correct the scanned image according to a correction instruction received from the user. After that, the process returns to the step S1205.

Figure 15:
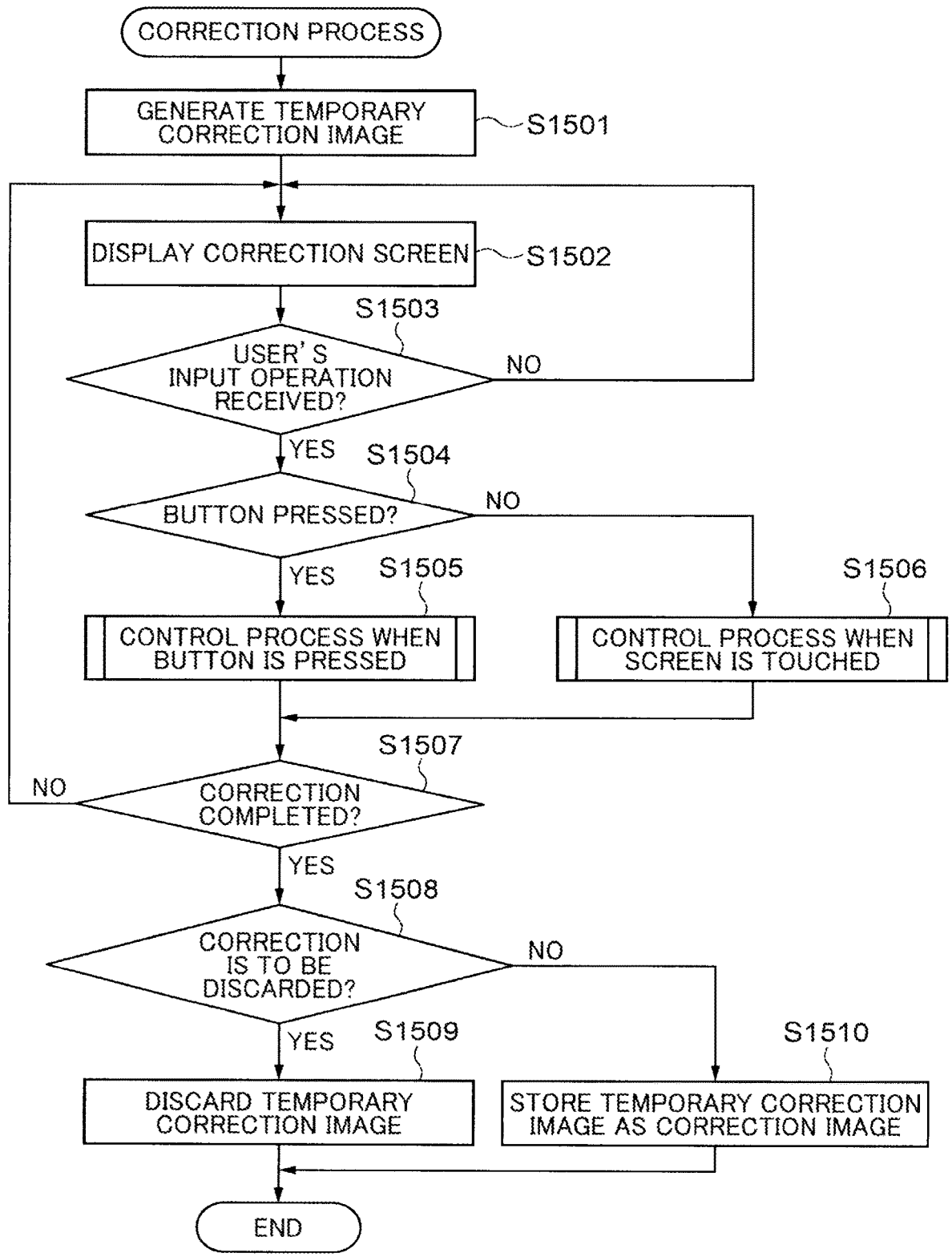
FIG. 15 is a flowchart of a correction process performed in a step in FIG. 12.

If it is determined in the step S1207 that the "correct" button 1302 on the preview screen 1301 has not been pressed by the user, the CPU 201 executes steps S1212 to S1215 which are the same as the steps S307 to S310. In the step S1215, for example, the corrected scanned image generated by the correction process, described hereinafter with reference to FIG. 15, is transmitted to the answer management server 103 as the answer data, followed by terminating the present process.

Figure 14:
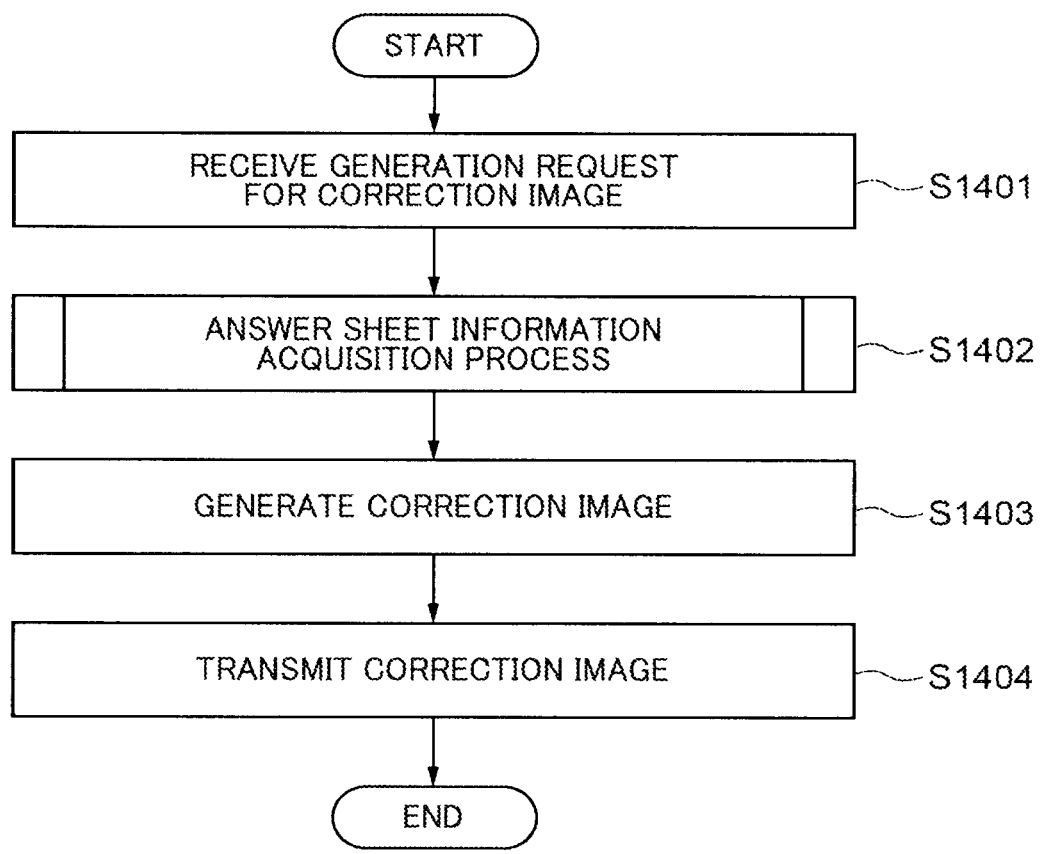
FIG. 14 is a flowchart of a correction image generation process performed by the image processing server appearing in FIG. 1.

FIG. 14 is a flowchart of a correction image generation process performed by the image processing server 102 appearing in FIG. 1. The correction image generation process in FIG. 14 is realized by the CPU of the controller 212 of the image processing server 102, which loads a program stored in the ROM into the RAM and executes the loaded program.

Figure 13B:
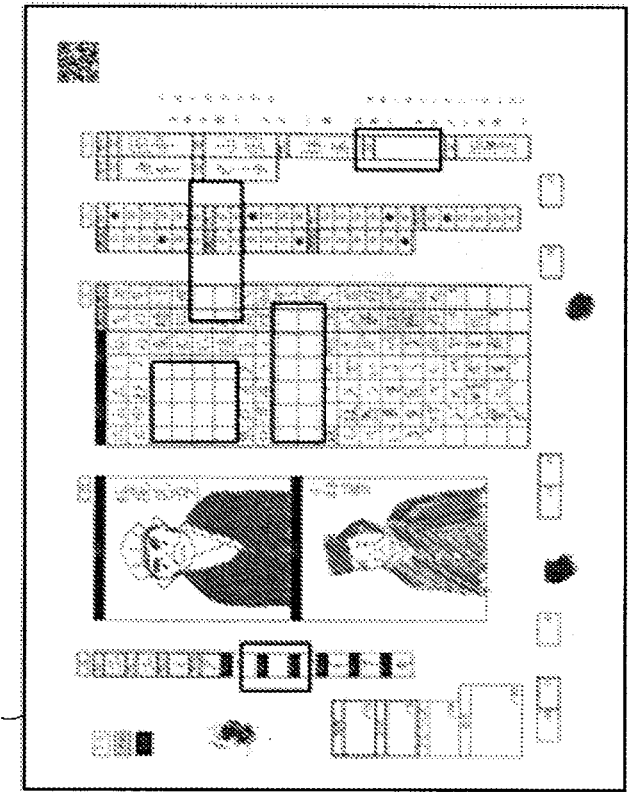
Figure 13C:
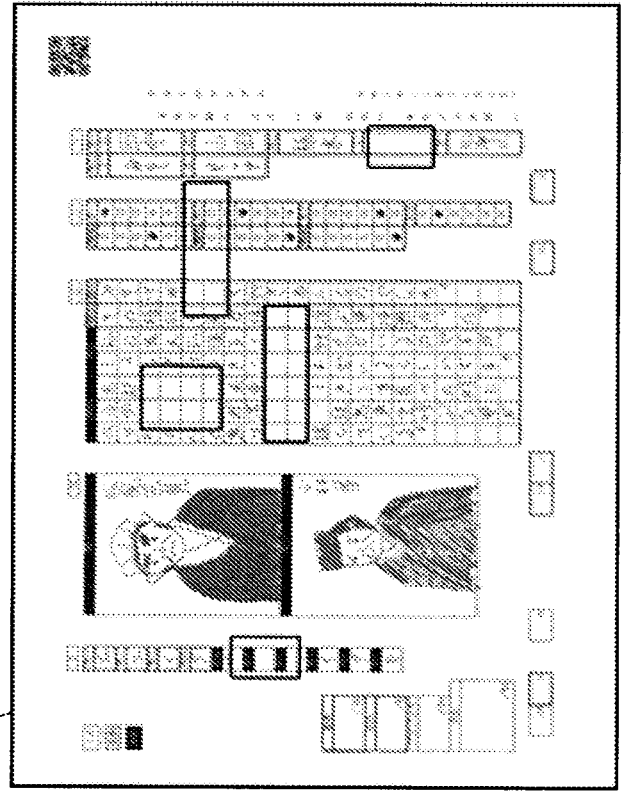

Referring to FIG. 14, the controller 212 receives the correction image generation request transmitted from the multifunction peripheral 101 in the above-mentioned step S1209 (step S1401). Then, the controller 212 performs the above-described answer sheet information acquisition process in FIG. 8A (step S1402) and acquires the answer sheet information concerning the scanned image of the answer sheet as a correction target. Then, the controller 212 generates a correction image (step S1403). In the step S1403, for example, the controller 212 copies respective images of answer field areas other than the undesired object areas in the scanned image of the answer sheet as correction target areas to the template image of the answer sheet. With this, a correction image 1304 shown in FIG. 13B is generated. Note that the method of generating a correction image is not limited to the above-described method. For example, respective images of areas corresponding to undesired object areas of the scanned image of the answer sheet as correction target areas may be extracted from the template image of the answer sheet, and the extracted images may be copied to the undesired object areas of the scanned image, respectively. With this, a correction image 1305 shown in FIG. 13C is generated. Then, the controller 212 transmits the generated correction image to the multifunction peripheral 101 (step S1404), followed by terminating the present process.

With the above-described correction image generation process, the user can generate the correction image for correcting the scanned image of the answer sheet.

Although in the present embodiment, the image processing server 102 generates a correction image, this is not limitative. For example, the multifunction peripheral 101 may generate a correction image by executing the above-described correction image generation process.

FIG. 15 is a flowchart of the correction process performed in the step S1211 in FIG. 12.

Referring to FIG. 15, the CPU 201 generates a temporary correction image in the RAM 203 by reading out the correction image stored in the RAM 203 and copying the correction image (step S1501). Then, the CPU 201 displays a correction screen 1306 shown in FIG. 13D on the console section 205 (step S1502). Then, the process proceeds to a step S1503.

The correction screen 1306 is displayed on the console section 205 when the user presses the "correct" button 1302 on the preview screen 1301. The correction screen 1306 is a screen for editing a scanned image of an answer sheet displayed on the console section 205 of the multifunction peripheral 101. On the correction screen 1306, a temporary correction image is displayed, and it is possible to perform operations on the temporary correction image, for correcting an area designated by the user, resetting the correction, applying the correction, canceling the correction, displaying an image in an enlarged state, displaying an image in a reduced state, changing a display area, and so forth.

When a reset button 1307 is pressed, details of correction performed on the temporary correction image are cleared. In the present embodiment, although the details of correction are uniformly cleared, control to restore the temporary correction image to a state before the latest one correction operation may be performed.

An eraser button 1308 is for activating an erase mode for erasing a designated area. In a case where the erase mode is activated, an area where the user touches on the temporary correction image displayed on the correction screen 1306 is changed to white. A pencil button 1309 is for activating an addition mode for adding a character, a diagram or the like, to a designated area. In a case where the addition mode is activated, an area where the user touches on the temporary correction image displayed on the correction screen 1306 is changed to black.

An "apply correction" button 1310 is for applying the details of correction and then returning the screen on the console section 205 to the preview screen 1301. A move button 1311 is for activating a display area change mode for changing the display area of the temporary correction image displayed on the console section 205. When the display area change mode is activated and then the user taps the correction screen 1306, an operation for moving the center coordinates of the display area of the temporary correction image is enabled, and the display area is changed in accordance with the movement of the center coordinates. Note that in the present embodiment, the operation for changing the center coordinates is not limited to tapping, but the center coordinates may be changed in accordance with an amount of change of the coordinates caused by long-tapping.

A zoom-in button 1312 is for enlarging the display area of the temporary correction image displayed on the console section 205. When the zoom-in button 1312 is pressed, the temporary correction image is displayed in an enlarged state as shown in FIG. 13E. Further, a zoom-out button 1313 appearing in FIG. 13E is pressed, the temporary correction image is displayed in a reduced state. Note that the enlargement ratio and the reduction ratio may be fixed or can be designated by a user using some method. A return button 1314 is for discarding all corrections performed on the correction screen 1306 and returning the screen on the console section 205 to the preview screen 1301.

Referring again to FIG. 15, in the step S1503, the CPU 201 determines whether or not the user has performed an input operation on the console section 205. If it is determined in the step S1503 that the user has not performed an input operation on the console section 205, the process returns to the step S1502. If it is determined in the step S1503 that the user has performed an input operation on the console section 205, the process proceeds to a step S1504.

In the step S1504, the CPU 201 determines whether or not one of the buttons displayed on the correction screen 1306 has been pressed by the user. If it is determined in the step S1504 that one of the buttons displayed on the correction screen 1306 has been pressed by the user, the process proceeds to a step S1505. If it is determined in the step S1504 that none of the buttons displayed on the correction screen 1306 have been pressed by the user, the process proceeds to a step S1506.

In the step S1505, the CPU 201 performs a control process responsive to pressing of a button, described hereinafter with reference to FIG. 16. In the control process responsive to pressing of a button, processing is executed in accordance with a type of the button pressed by the user. Then, the process proceeds to a step S1507.

In the step S1506, the CPU 201 performs a control process responsive to touching of the screen, described hereinafter with reference to FIG. 17. In the control process responsive to touching of the screen, processing is executed in accordance with a type of the mode activated by the user on the correction screen 1306. Then, the CPU 201 determines whether or not the correction is completed (step S1507). In the step S1507, for example, in a case where it is not detected that the user has pressed the "apply correction" button 1310 or the return button 1314 on the correction screen 1306, the CPU 201 determines that the correction is not completed. In this case, the process returns to the step S1502. On the other hand, in a case where it is detected that the user has pressed one of the "apply correction" button 1310 and the return button 1314 on the correction screen 1306, the CPU 201 determines that the correction is completed. In this case, the process proceeds to a step S1508.

In the step S1508, the CPU 201 determines whether or not to discard the correction. In the step S1508, for example, in a case where it is detected that the user has pressed the return button 1314 on the correction screen 1306, the CPU 201 determines to discard the correction. In this case, the process proceeds to a step S1509. On the other hand, in a case where it is not detected that the user has pressed the return button 1314 on the correction screen 1306, the CPU 201 determines not to discard the correction. In this case, the process proceeds to a step S1510.

In the step S1509, the CPU 201 deletes the temporary correction image from the RAM 203. With this, the correction performed by the user on the correction screen 1306 is not reflected on the scanned image to be submitted to the answer management server 103, followed by terminating the present process.

In the step S1510, the CPU 201 stores the temporary correction image as the correction image. More specifically, the CPU 201 overwrites the correction image in the RAM 203 with the temporary correction image and saves the overwritten correction image, thereby deleting the old correction image in the RAM 20. With this, the correction performed by the user on the correction screen 1306 is reflected on the scanned image to be submitted to the answer management server 103. After that, the present process is terminated.

With the above-described correction process, the user can correct undesired object areas detected from the scanned image of the answer sheet.

Figure 16:
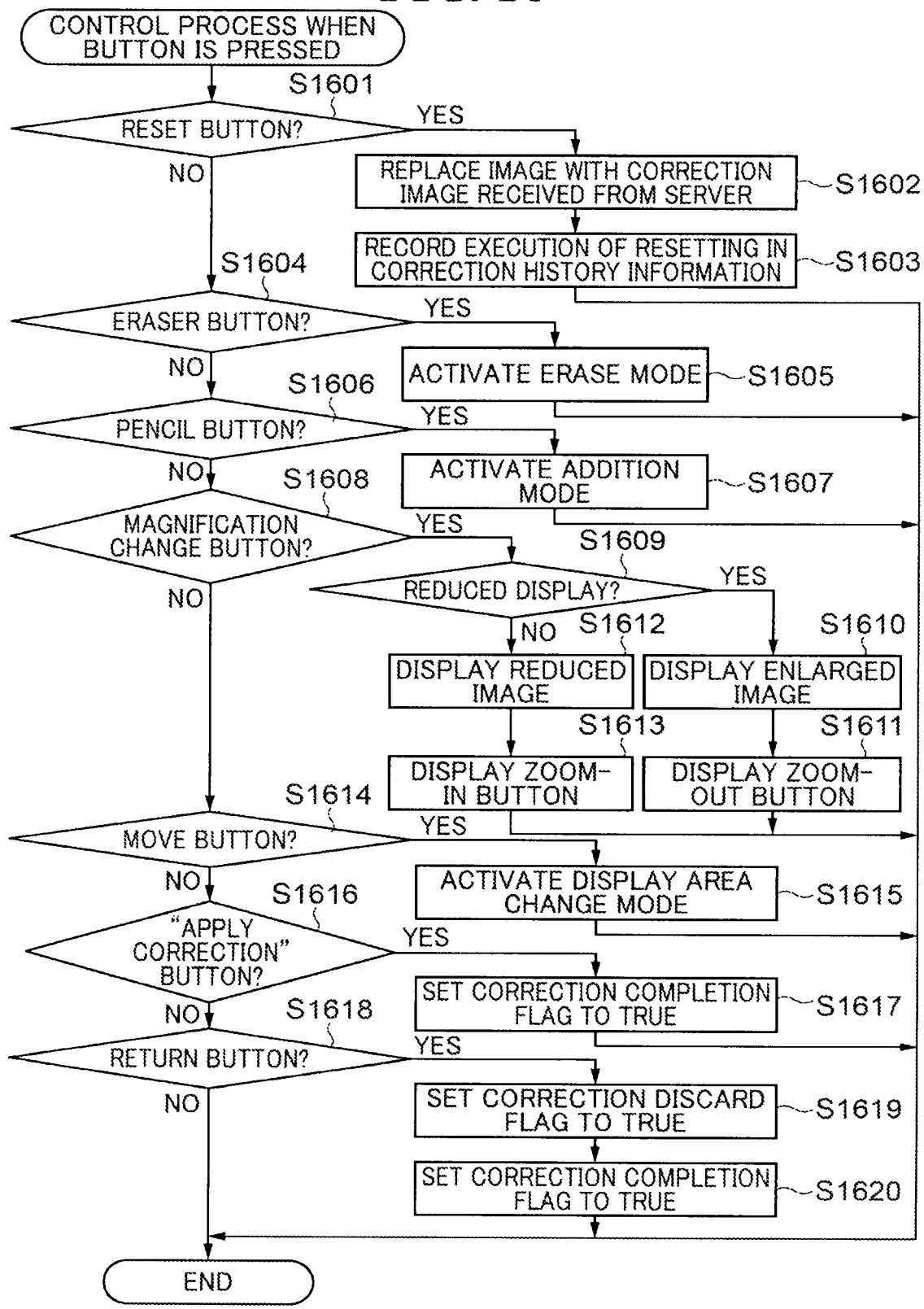
FIG. 16 is a flowchart of a control process responsive to pressing of a button in a step in FIG. 15.

FIG. 16 is a flowchart of the control process responsive to pressing of a button in the step S1505 in FIG. 15.

Referring to FIG. 16, the CPU 201 determines whether or not the reset button 1307 has been pressed by the user (step S1601). If it is determined in the step S1601 that the reset button 1307 has been pressed by the user, the process proceeds to a step S1602. If it is determined in the step S1601 that the reset button 1307 has not been pressed by the user, the process proceeds to a step S1604, described hereinafter.

In the step S1602, the CPU 201 replaces the temporary correction image edited by the user with the correction image received from the image processing server 102 and saves the correction image in the RAM 203. With this, all the corrections performed by the user on the correction screen 1603 are reset to a cleared state. Then, the CPU 201 records execution of resetting, in the correction history information in the RAM 203 (step S1603), followed by terminating the present process.

In the step S1604, the CPU 201 determines whether or not the eraser button 1308 has been pressed by the user. If it is determined in the step S1604 that the eraser button 1308 has been pressed by the user, the process proceeds to a step S1605. If it is determined in the step S1604 that the eraser button 1308 has not been pressed by the user, the process proceeds to a step S1606.

In the step S1605, the CPU 201 activates the erase mode, followed by terminating the present process. When the erase mode is activated in the step S1605, an area designated by the user on the temporary correction image can be changed to white in the step S1506 in FIG. 15.

In the step S1606, the CPU 201 determines whether or not the pencil button 1309 has been pressed by the user. If it is determined in the step S1606 that the pencil button 1309 has been pressed by the user, the process proceeds to a step S1607. If it is determined in the step S1606 that the pencil button 1309 has not been pressed by the user, the process proceeds to a step S1608, described hereinafter.

In the step S1607, the CPU 201 activates the addition mode followed by terminating the present process. When the addition mode is activated in the step S1607, an area designated by the user on the temporary correction image can be changed to black in the step S1506 in FIG. 15.

In the step S1608, the CPU 201 determines whether or not the magnification change button, such as the zoom-in button 1312 or the zoom-out button 1313, has been pressed by the user. If it is determined in the step S1608 that the magnification change button has been pressed by the user, the process proceeds to a step S1609. If it is determined in the step S1608 that the magnification change button has not been pressed by the user, the process proceeds to a step S1614, described hereinafter.

In the step S1609, the CPU 201 determines whether or not the temporary correction image is displayed in a reduced state on the correction screen 1306 displayed on the console section 205. If it is determined in the step S1609 that the temporary correction image is displayed in the reduced state, the process proceeds to a step S1610. If it is determined in the step S1609 that the temporary correction image is not displayed in the reduced state, the process proceeds to a step S1612, described hereinafter.

In the step S1610, the CPU 201 displays the temporary correction image in an enlarged state. Then, the CPU 201 displays the zoom-out button 1313 on the correction screen 1306 (step S1611), followed by terminating the present process. Although in the present embodiment, the zoom-out button 1313 is displayed in the step S1611, by way of example, this is not limitative, but control of displaying the zoom-in button 1312 to increase the enlargement ratio may be performed.

In the step S1612, the CPU 201 displays the temporary correction image in the reduced state. Then, the CPU 201 displays the zoom-in button 1312 on the correction screen 1306 (step S1613), followed by terminating the present process. Although in the present embodiment, the zoom-in button 1312 is displayed in the step S1613, by way of example, this is not limitative, but the control of displaying the zoom-out button 1313 to increase the reduction ratio may be performed.

In the step S1614, the CPU 201 determines whether or not the move button 1311 has been pressed by the user. If it is determined in the step S1614 that the move button 1311 has been pressed by the user, the process proceeds to a step S1615. If it is determined in the step S1614 that the move button 1311 has not been pressed by the user, the process proceeds to a step S1616.

In the step S1615, the CPU 201 activates the display area change mode, followed by terminating the present process. When the display area change mode is activated in the step S1615, the display area of the temporary correction image can be moved in the step S1506.

In the step S1616, the CPU 201 determines whether or not the "apply correction" button 1310 has been pressed by the user. If it is determined in the step S1616 that the "apply correction" button 1310 has been pressed by the user, the process proceeds to a step S1617. If it is determined in the step S1616 that the "apply correction" button 1310 has not been pressed by the user, the process proceeds to a step S1618.

In the step S1617, the CPU 201 sets a correction completion flag to "TRUE", followed by terminating the present process. When the correction completion flag is set to "TRUE", the details of correction are applied, and the screen on the console section 205 is changed to the preview screen 1301.

In the step S1618, the CPU 201 determines whether or not the return button 1314 has been pressed by the user. If it is determined in the step S1618 that the return button 1314 has been pressed by the user, the process proceeds to a step S1619. If it is determined in the step S1618 that the return button 1314 has not been pressed by the user, the present process is terminated.

In the step S1619, the CPU 201 sets a correction discard flag to "TRUE". Then, the CPU 201 sets the correction completion flag to "TRUE" (step S1620). In this case, since the correction discard flag is set to "TRUE", the corrections performed on the correction screen 1306 are discarded, and the screen on the console section 205 is changed to the preview screen 1301, followed by terminating the present process.

Figure 17:
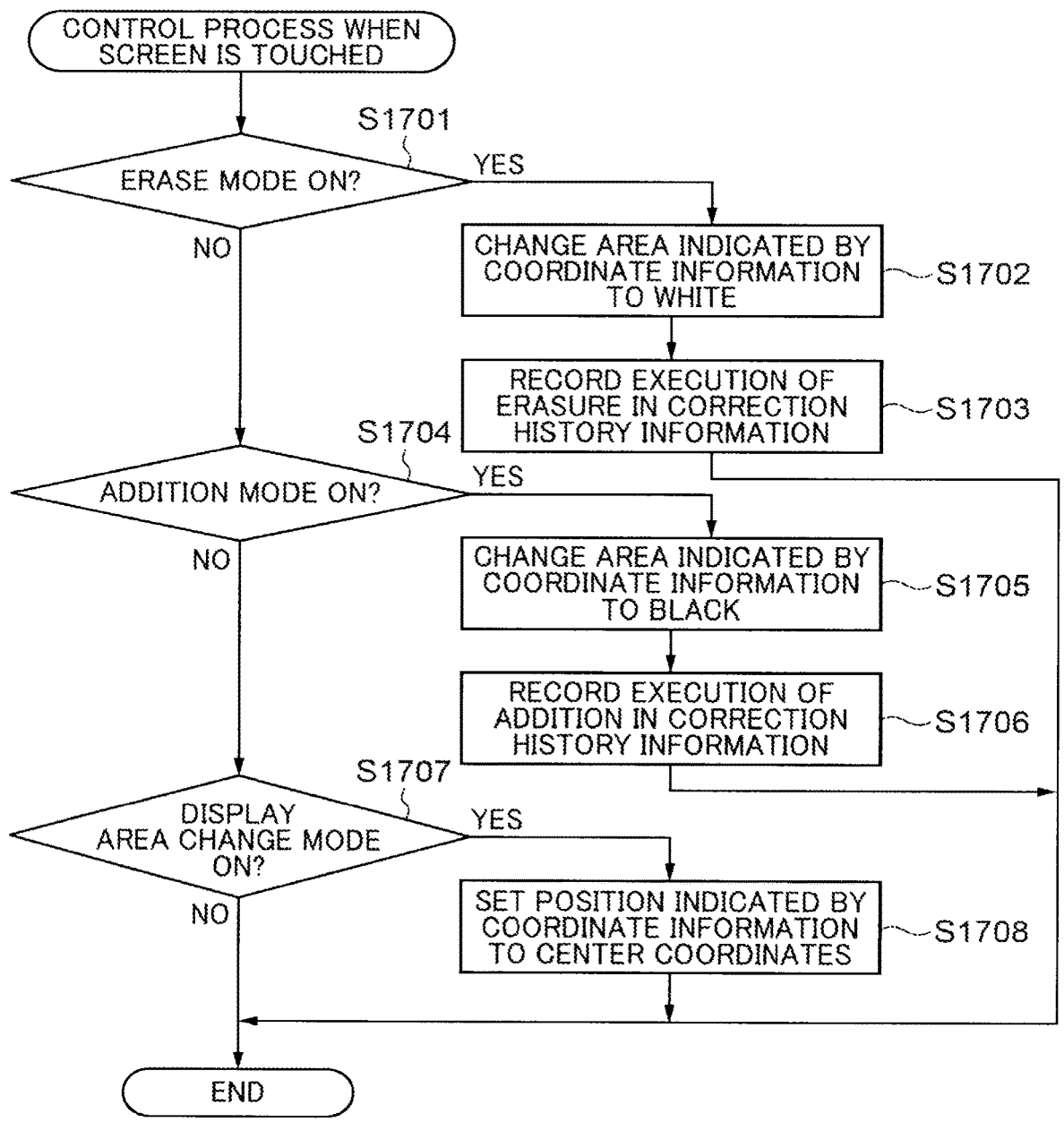
FIG. 17 is a flowchart of a control process responsive to touching of a screen in a step in FIG. 15.

FIG. 17 is a flowchart of the control process responsive to touching of the screen in the step S1506 in FIG. 15.

Referring to FIG. 17, the CPU 201 determines whether or not the erase mode is activated (step S1701). If it is determined in the step S1701 that the erase mode is activated, the CPU 201 acquires the coordinate information indicating a position where the user has touched the temporary correction image displayed on the correction screen 1306. Then, the process proceeds to a step S1702. If it is determined in the step S1701 that the erase mode is not activated, the process proceeds to a step S1704, described hereinafter.

In the step S1702, the CPU 201 changes the area on the temporary correction image, indicated by the coordinate information, to white. In the step S1702, for example, in a case where the temporary correction image is a density-based image, the pixel values of the area indicated by the coordinate information are set to "0". Further, in a case where the temporary correction image is a luminance-based image, the pixel values of the area indicated by the coordinate information are set to the maximum value, such as 255. Then, the CPU 201 records execution of erasure, in the correction history information in the RAM 203 (step S1703), followed by terminating the present process.

In the step S1704, the CPU 201 determines whether or not the addition mode is activated. If it is determined in the step S1704 that the addition mode is activated, the CPU 201 acquires the coordinate information indicating a position where the user has touched the temporary correction image displayed on the correction screen 1306. Then, the process proceeds to a step S1705. If it is determined in the step S1704 that the addition mode is not activated, the process proceeds to a step S1707, described hereinafter.

In the step S1705, the CPU 201 changes the area on the temporary correction image, indicated by the coordinate information, to black. In the step S1705, for example, in a case where the temporary correction image is a density-based image, the pixel values of the area indicated by the coordinate information are set to the maximum value, such as "255". Further, in a case where the temporary correction image is a luminance-based image, the pixel values of the area indicated by the coordinate information are set to "0". Then, the CPU 201 records execution of addition, in the correction history information in the RAM 203 (step S1706), followed by terminating the present process.

In the step S1707, the CPU 201 determines whether or not the display area change mode is activated. If it is determined in the step S1707 that the display area change mode is activated, the CPU 201 acquires the coordinate information indicating a position where the user has touched the temporary correction image displayed on the correction screen 1306. Then, the process proceeds to a step S1708. If it is determined in the step S1701 that the display area change mode is not activated, the present process is terminated.

In the step S1708, the CPU 201 sets the position indicated by the acquired coordinate information as the center coordinates of the display area. With this, it is possible to change the display area of the temporary correction image according to an input of the user. After that, the present process is terminated.

Thus, in the above-described embodiment, an instruction for correcting a detected undesired object area is received from a user. With this, it is possible to obtain a scanned image from which the undesired object area is eliminated, and thereby prevent resubmission of the scanned image from being required.

In the above-described embodiment, a user can digitally perform correction on a scanned image of an answer sheet as an original, and hence an image obtained after correction may be left as the original. For example, after transmitting answer data in the step S1215, the corrected scanned image may be printed. In this configuration, from a viewpoint of preventing generation of charge unintended by a user, it is preferable to inquire the user about the charge, on the console section 205, and perform printing according to an instruction from the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-056178 filed Mar. 30, 2022, which is hereby incorporated by reference herein in its entirety.

What is claimed is:

1. An image processing system comprising:
a scanner configured to read a document and generate a scanned image of the read document, the document being a written form sheet written on a blank form sheet;
a communication interface configured to transmit the scanned image to a management server;
at least one processor configured to:
identify a continuous pixel area from the scanned image, the continuous pixel area including:
a plurality of pixels whose pixel values are higher than a predetermined density threshold value; and
an area size equal to or larger than a predetermined value;
determine whether or not the identified continuous pixel area is an undesirable area of an undesired object that obstructs visibility, by comparing the scanned image with a blank form image of the blank form sheet; and
notify a user that the continuous pixel area is determined as the undesirable area, before transmitting the scanned image to the management server.

2. The image processing system according to claim 1, wherein the written form sheet is an answer sheet on which answers have been written on the blank form sheet, which is the answer sheet on which no answer has been written.

3. The image processing system according to claim 2, wherein the blank form image is a template image.

4. The image processing system according to claim 3, wherein the at least one processor is further configured to acquire the template image based on code information printed on the answer sheet.

5. The image processing system according to claim 3, wherein the undesirable area is the continuous pixel area that is not identified from the template image and is superimposed on a marking field area of the template image.

6. The image processing system according to claim 3, wherein the undesirable area is the continuous pixel area that is not identified from the template image and is superimposed on an answer field area of the template image other than a drawing form and a computer-scored answer form.

7. The image processing system according to claim 3, wherein the undesirable area is the continuous pixel area that is not identified from the template image and is superimposed on an answer field area of a drawing form or an answer field area of a computer-scored answer form.

8. The image processing system according to claim 1, further comprising a user interface configured to receive an instruction from a user, for correcting the continuous pixel area determined as the undesirable area.

9. The image processing system according to claim 1, wherein:
the at least one processor includes a first processor and a second processor,
the image processing system includes:
an image processing apparatus including the first processor that:
identifies the continuous pixel area; and
determines the undesirable area, and
the image forming apparatus includes the image scanner and the second processor that notifies the user of the determined undesirable area.

10. An image forming apparatus comprising:
an image scanner configured to read a document and generate a scanned image of the read document, the document being a written form sheet written on a blank form sheet;
a communication interface configured to transmit the scanned an image to a management server; and
a processor configured to:
identify a continuous pixel area from the scanned image, the continuous pixel area including:

a plurality of pixels whose pixel values are higher than a predetermined density threshold value; and an area size equal to or larger than a predetermined value;

determine whether or not the identified continuous pixel area is an undesirable area of an undesired object that obstructs visibility, by comparing the scanned image with a blank form image of the blank form sheet; and notify a user that the continuous pixel area is determined as the undesirable area before transmitting the scanned image is to the management server.

11. A method of controlling an image forming apparatus that transmits a scanned image to a management server, the method comprising:

reading a document and generating the scanned image of the read document, the document being a written form sheet written on a blank form sheet;

identifying a continuous pixel area from the scanned image, the continuous pixel area including:

a plurality of pixels whose pixel values are higher than a predetermined density threshold value; and an area size equal to or larger than a predetermined value;

determining whether or not the identified continuous pixel area is an undesirable area of an undesired object that obstructs visibility, by comparing the scanned image with a blank form image of the blank form sheet; and notifying a user that the continuous pixel area is determined as the undesirable area before transmitting the scanned image to the management server.

12. A non-transitory computer-readable storage medium storing a program executable by a computer of an image forming apparatus that transmits a scanned image to a management server to execute a method comprising:

reading a document and generating the scanned image of the read document, the document being a written form sheet written on a blank form sheet;

identifying a continuous pixel area from the scanned image, the continuous pixel area including:

a plurality of pixels whose pixel values are higher than a predetermined density threshold value; and an area size equal to or larger than a predetermined value;

determining whether or not the identified continuous pixel area is an undesirable area of an undesired object that obstructs visibility, by comparing the scanned image with a blank form image of the blank form sheet; and notifying a user that the continuous pixel area is determined as the undesirable area before transmitting the scanned image to the management server.

* * * * *